United States Patent
Saito

(10) Patent No.: US 8,340,896 B2
(45) Date of Patent: Dec. 25, 2012

(54) ROAD SHAPE RECOGNITION DEVICE

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/782,309

(22) Filed: May 18, 2010

(65) Prior Publication Data

US 2010/0299109 A1    Nov. 25, 2010

(30) Foreign Application Priority Data

May 22, 2009   (JP) ................................. 2009-123742

(51) Int. Cl.
*G01C 21/00* (2006.01)

(52) U.S. Cl. ............ 701/408; 701/10; 701/28; 701/117; 701/118; 701/119; 701/65; 701/80; 701/523; 340/902; 340/903; 340/904; 340/905; 340/906; 340/438; 340/439; 340/919; 340/933; 382/104; 382/106; 382/107; 382/154; 382/199; 703/4; 703/8

(58) Field of Classification Search .................... 701/10, 701/28, 117, 118, 119; 340/919, 933, 902, 340/903, 904, 905, 906, 907, 908, 438, 439; 382/104, 106, 107, 154, 199; 703/4, 8

See application file for complete search history.

(56) References Cited

U.S. PATENT DOCUMENTS

| | | | | |
|---|---|---|---|---|
| 5,487,116 A | * | 1/1996 | Nakano et al. | 382/104 |
| 5,708,427 A | * | 1/1998 | Bush | 340/941 |
| 6,449,383 B1 | * | 9/2002 | Oike et al. | 382/104 |
| 6,813,370 B1 | * | 11/2004 | Arai | 382/104 |

FOREIGN PATENT DOCUMENTS

| | | |
|---|---|---|
| JP | 6-266828 | 9/1994 |
| JP | 2001-92970 | 4/2001 |
| JP | 2001-227944 | 8/2001 |

* cited by examiner

*Primary Examiner* — Redhwan K Mawari
(74) *Attorney, Agent, or Firm* — Smith, Gambrell & Russell, LLP

(57) ABSTRACT

A road shape recognition device includes: distance and height detecting means for detecting distance data having a distance and height in real space regarding a road surface where a vehicle is traveling at multiple mutually different points; approximation line calculating means for dividing the plurality of distance data into near and far groups as viewed from the vehicle to calculate an approximation line of the distance data for each group each time the distance data of the boundary portion between the two groups is transferred from one of the groups to the other; statistics calculating means for calculating statistics from the corresponding approximation line for each group where the distance data is transferred; and road shape model generating means for selecting one out of combinations of the approximation lines to generate a road shape model using the selected combination.

7 Claims, 14 Drawing Sheets

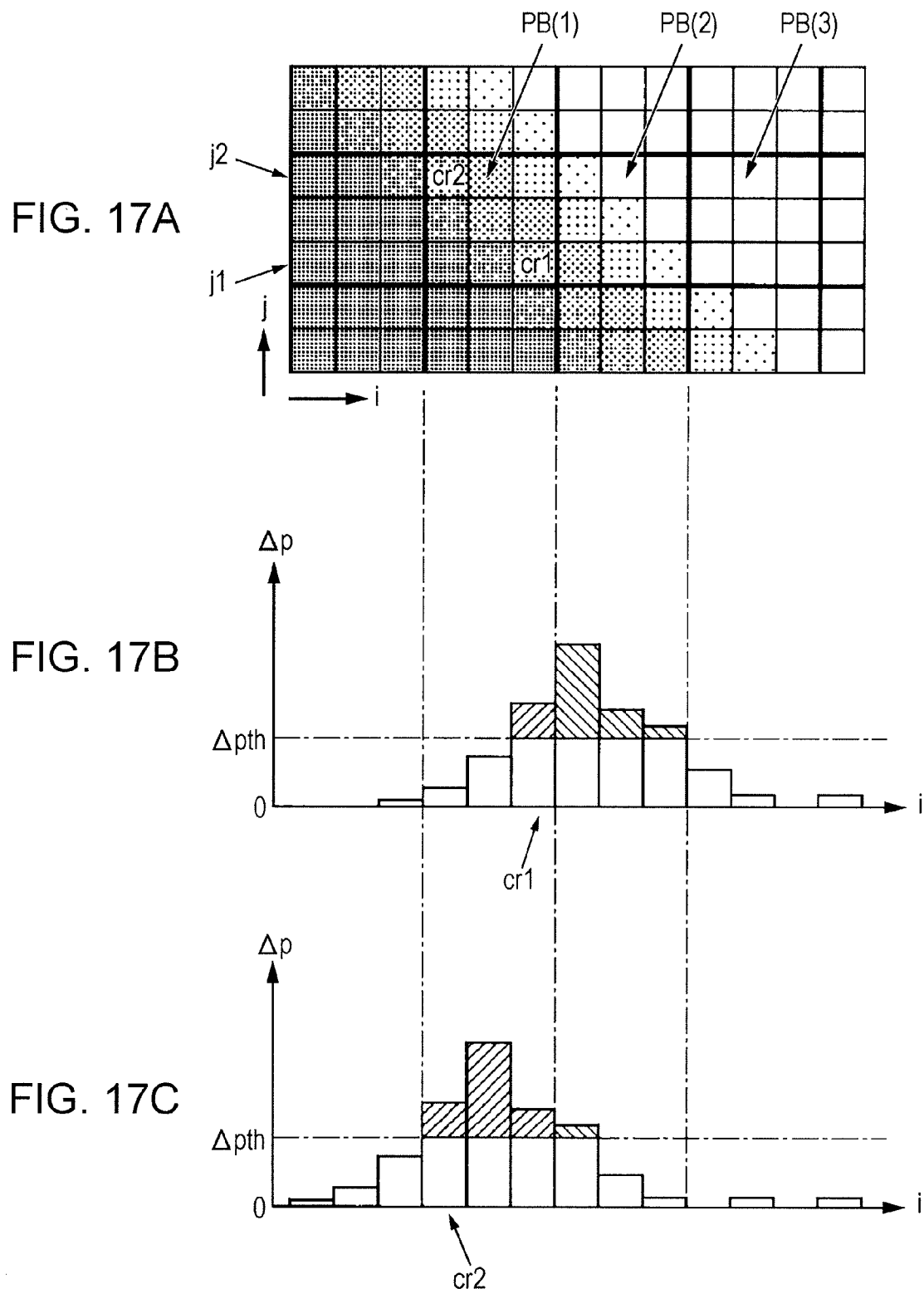

ROAD SHAPE RECOGNITION DEVICE

CROSS-REFERENCE TO RELATED APPLICATIONS

The present application claims priority from Japanese Patent Application No. 2009-123742 filed on May 22, 2009, and is hereby incorporated by reference in its entirety.

BACKGROUND OF THE INVENTION

1. Field of the Invention

The present invention relates to road shape recognition devices, and specifically relates to a road shape recognition device which generates a road shape model based on distance data obtained by distance and height detecting means.

2. Description of the Related Art

In recent years, development of road shape recognition devices has been underway, in which an image capturing device such as a Charge Coupled Device (CCD) camera and Complementary Metal Oxide Semiconductor (CMOS) camera, or a laser radar distance measuring device, is mounted on a vehicle, and a road shape where the vehicle equipped with such a device is traveling is recognized by image analysis of an image captured with the image capturing means, or by reflected light analysis of radio waves or a laser beam emitted from the laser radar distance measuring device, or the like (e.g., see Japanese Unexamined Patent Application Publication (JP-A) Nos. 1994-266828, 2001-092970 and 2001-227944).

JP-A No. 1994-266828 discloses a technique wherein image capturing means comprised of a stereo camera or a laser radar distance measuring device is used, and distance data in real space up to an object in front of such a device is detected based on the triangulation principle, or by reflected light analysis of a laser beam or the like. Subsequently, of the distance data thereof, distance data included in a window, which is set by three-dimensional or two-dimensional projection based on a road shape model detected at a last sampling cycle, is subjected to linear approximation for each section set in the front of a vehicle, and road shape models in the horizontal direction and in the vertical direction are calculated.

In addition, JP-A No. 2001-092970 discloses a technique wherein, of a pair of images captured with image capturing means comprised of a stereo camera, pixels corresponding to a lane line lateral to a vehicle are detected out of the image based on the luminance of each pixel of one of the images, the distance data of the pixels corresponding to the detected lane line is subjected to linear approximation for each section set in the front of the vehicle, and road shape models in the horizontal direction and in the vertical direction are calculated. Note that the "lane line" means a continuous line or dashed line marked on a road surface such as a no-passing line, a dividing line which divides a side strip and a roadway.

Further, in JP-A No. 2001-227944, description is made wherein an image capturing device comprised of a stereo camera is used, and with regard to the horizontal direction, i.e., a direction where a traveling route curves, a road shape is approximated by a quadratic function, while with regard to the vertical direction, the slope angle of a road surface is calculated from engine output and acceleration at the time of the vehicle traveling.

The road shapes, particularly a road shape in the vertical direction (height direction) can be modeled by subjecting the distance data of pixels corresponding to a detected lane line to linear approximation for each section in front of a vehicle, as described in JP-A No. 2001-092970 or the like. However, processing load may be large when dividing a region in front of the vehicle into a great number of sections and performing linear approximation for each section.

Therefore, in actual practice, in order to simplify and alleviate the processing load, a region in front of the vehicle is often divided into two sections of the near side and the far side of the vehicle with a fixed distance from the vehicle as a boundary, and regarding the two sections, distance data up to an object obtained by image analysis of a captured image, reflected light analysis using a laser radar distance measuring device, or the like, is subjected to linear approximation to calculate a road shape model.

For example, when a road where a vehicle is traveling has an uphill A in the distance as shown in FIG. 18A, by taking the height direction (vertical direction) as the Y axis and the distance direction (the forward direction of the vehicle) as the Z axis, distance data is plotted on a Z-Y plane as shown in FIG. 18B. Subsequently, for example, when sections $R_1$ and $R_2$ are divided with a position as a boundary that is distant from the vehicle located at the position of $Z=0$ by a fixed distance $Z_0$, distance data of the sections $R_1$ and $R_2$ is subjected to linear approximation as shown in FIG. 18B, and a road shape model is generated.

In this case, the distance data in the sections $R_1$ and $R_2$ are approximated by, for example, approximation lines $L_1$ and $L_2$, and distance data corresponding to the distant uphill A exists above the approximation line $L_2$. Accordingly, the distance data corresponding to the uphill A may accidentally satisfy a condition for detecting a three-dimensional object, and the portion of the uphill A may be erroneously detected as a three-dimensional object existing on a road surface.

Moreover, when a road where a vehicle is traveling has a downhill B in the distance as shown in FIG. 19A and distance data is plotted in the same way as with FIG. 18B, the distance data is plotted on a Z-Y plane as shown in FIG. 19B. Subsequently, the distance data of the sections $R_1$ and $R_2$ divided with the position of the distance $Z_0$ as a boundary, are approximated by the approximation lines $L_1$ and $L_2$ respectively, and a road shape model is generated.

In this case, when a preceding vehicle Vah is traveling on the road surface of the downhill B as shown in FIG. 19A, the distance data of the back portion of the preceding vehicle Vah is detected on the upper side of the distance data of the downhill B, as shown in FIG. 19B. However, as shown in FIG. 19B, in a situation in which the back portion of the preceding vehicle Vah exists on an extension of the flat road surface in front of the downhill B, at the time of performing linear approximation using the section $R_2$, the distance data of the preceding vehicle Vah is not distinguished from the distance data of the road surface and is subjected to linear approximation, and consequently the preceding vehicle Vah may be erroneously detected as a road surface.

In the event that the above erroneous detection of a three-dimensional object or preceding vehicle Vah occurs, for example, automatic control of the vehicle performed based on the information thereof may be different from a driver's intention. In addition, as shown in FIGS. 18B and 19B, in the case that a region in front the vehicle is divided into sections $R_1$ and $R_2$ with the position far from the vehicle by the fixed distance $Z_0$ as a boundary, and is subjected to linear approximation, the approximation lines $L_1$ and $L_2$, i.e., a road shape model is not necessarily a model appropriately representing a real road shape.

A possible solution of this problem is to set the position of a boundary for dividing a region in front of the vehicle (the position of the distance $Z_0$ in the above example) not fixedly but variably, calculate the approximation lines $L_1$ and $L_2$ for the divided sections $R_1$ and $R_2$ respectively, and search the most appropriate boundary position and approximation lines $L_1$ and $L_2$. However, if processing thereof takes time, it is difficult to apply this processing to an automatic control technique of the vehicle, or the like.

SUMMARY OF THE INVENTION

The present invention has been made in light of the above, and an object of the present invention is to provide a road shape recognition device capable of accurately detecting a real road shape. Another object of the present invention is to provide a road shape recognition device capable of performing road shape detection at a high speed.

In order to solve the above problem, a road shape recognition device according to a first aspect of the present invention includes distance and height detecting means that detects distance data having at least information of distance and height in real space regarding a road surface where a vehicle is traveling at a plurality of mutually different points; approximation line calculating means that divides the plurality of distance data into a near group and a far group as viewed from the vehicle based on the distance in real space, and calculates a approximation line for approximating the distance data for each group each time the distance data of the boundary portion between the two groups is transferred from one of the groups to the other of the groups; statistics calculating means that calculates statistics for each group where the distance data is transferred, based on the corresponding approximation line; and road shape model generating means that selects one out of combinations of the approximation lines of the two groups to generate a road shape model using the selected combination of the approximation lines as at least a road shape on a distance-height plane, based on the calculated statistics of the two groups.

A second aspect of the present invention is the road shape recognition device according to the first aspect, wherein the approximation line calculating means uses the least square method to calculate the corresponding approximation line for approximating the distance data for each of the groups. Further, the statistics calculating means calculates a variance or standard deviation as to the approximation lines of the distance data belonging to the groups respectively as the statistics. Furthermore, the road shape model generating means selects a combination of the approximation lines that minimizes the total sum of the calculated statistics of the two groups.

A third aspect of the present invention is the road shape recognition device according to the second aspect, wherein, when the distance and height in real space of the distance data are represented as Z and Y respectively, the distance and height in real space of the distance data of the boundary portion to be transferred as Za and Ya respectively, and the summation for each of the groups as E, the approximation line calculating means calculates the corresponding approximation line for approximating the distance data for each group using the least square method by subtracting Za, Ya, $Za^2$ and ZaYa from $\Sigma Z$, $\Sigma Y$, $\Sigma Z^2$ and $\Sigma ZY$ of one of the groups respectively, and adding Za, Ya, $Za^2$ and ZaYa to $\Sigma Z$, $\Sigma Y$, $\Sigma Z^2$, and $\Sigma ZY$ of the other of the groups respectively each time the distance data of the boundary portion is transferred from the one of the groups to the other of the groups.

A fourth aspect of the present invention is the road shape recognition device according to the first aspect, wherein among the plurality of distance data detected by the distance and height detecting means, the approximation line calculating means approximates, using the approximation lines a plurality of distance data included in a predetermined range from the position of a road shape model of a current sampling cycle. The position of the road shape model of a current sampling cycle is estimated from a subsequent behavior of the vehicle, based on the road shape models detected at past sampling cycles.

A fifth aspect of the present invention is the road shape recognition device according to the first aspect, wherein the road shape model generating means replaces an intersection portion of the selected approximation lines of the two groups with an easement curve the tangent lines of which are the approximation lines to correct the generated road shape model.

A sixth aspect of the present invention is the road shape recognition device according to the first aspect that further includes road marking detecting means to detect a road marking point corresponding to a marking on a road surface including a lane line marked lateral to the vehicle. Moreover, the approximation line calculating means calculates the approximation line for each of the groups, using the plurality of distance data, which corresponds to the road marking point detected by the road marking detecting means, of which at least the distance and height in real space are detected by the distance and height detecting means.

A seventh aspect of the present invention is the road shape recognition device according to the sixth aspect, wherein the distance and height detecting means uses stereo matching as to a pair of images captured by the image capturing means to detect the distance data for each pixel of at least one image of the pair of images. Further, the road marking detecting means detects the road marking point based on the luminance of pixels of the one image. Moreover, the approximation line calculating means corrects the distance data corresponding to the road marking point detected by the road marking detecting means, based on the luminance of pixels near this road marking point including this road marking point, and then approximates a plurality of corrected distance data by the approximation lines.

According to the first aspect, distance data having information of distance and height in real space regarding a road surface on which a vehicle is traveling is detected at a plurality of mutually different points, the plurality of distance data are divided into a near group and a far group as viewed from the vehicle, the corresponding approximation line for approximating distance data is calculated for each of the groups while moving a boundary as a variable. Subsequently, statistics based on each of the approximation lines are calculated for each of the groups, a combination of the approximation lines is selected based on the statistics thereof, and a road shape model is generated.

Thus, in a real road design, a road shape on a distance-height plane (longitudinal linear shape) is comprised of two straight lines and a easement curve, but an appropriate combination of two approximation lines is searched while changing the boundary of the groups, a road shape model may accurately be generated using a combination of the two approximation lines (or a combination of these and the easement curve) in accordance with the real road design thereof, and accordingly, a road shape can accurately be recognized.

According to the second aspect, the approximation lines are calculated by the least square method, a variance or standard deviation as to the approximation line of the distance data belonging to each of the groups is calculated for each of the groups as the statistics, a combination of the approximation lines is selected that minimizes the total sum thereof. As a result, in addition to the advantage of the above aspect, a combination of the approximation lines can accurately be selected at a high speed, and recognition of a road shape can accurately be performed at a high speed.

According to the third aspect, at the time of calculating the approximation lines using the least square method, each time the distance data Da of the boundary portion of each of the groups is transferred from one group to the other group, Za and the like corresponding to the distance data Da are subtracted from the summation ΣZ and the like of the one group respectively, and added to the summation ΣZ and the like of the other group respectively. Only by this, each expression of the approximation lines can be calculated, and accordingly, calculation of the approximation lines can readily be performed at a high speed, and the advantages of the above aspects can be exhibited in a more accurate manner.

According to the fourth aspect, distance data serving as a calculation object of the approximation lines is limited to distance data included in a predetermined range from the position of a road shape model generated at a current sampling cycle that is estimated from the subsequent behavior of the vehicle, based on the road shape models generated at the past sampling cycles. As a result, calculation of the approximation lines can be performed in a state in which a three-dimensional object existing above the road surface such as the preceding vehicle is eliminated.

Thus, a road shape model can accurately be generated from such approximation lines according to the shape of the real road surface. Further, since the search range of the distance data is limited, the calculation processing of the approximation lines can be performed at a higher speed, and the advantages of the above aspects can be exhibited in a more accurate manner.

According to the fifth aspect, in the real road design as well, a road shape on the distance-height plane (longitudinal linear shape) is comprised of two straight lines and a easement curve, a road shape model can accurately be generated by a combination of the two approximation lines and the easement curve, according to the real road design. Consequently, a road shape can accurately be recognized, and the advantages of the above aspects can be exhibited in a more accurate manner.

According to the sixth aspect, a road marking point corresponding to a marking on a road surface such as a lane line lateral to the vehicle, a numeral and an arrow are detected, and a road shape model is generated using the distance data corresponding to each road marking point. As a result, calculation of the approximation lines can be performed in a state in which distance data corresponding a three-dimensional object existing above the road surface such as the preceding vehicle is eliminated. Accordingly, a road shape model can be generated more accurately from such approximation lines according to the shape of the real road surface, and the advantages of the above aspects can be exhibited in a more accurate manner.

According to the seventh aspect, in stereo matching as to a marking on a road surface, road marking points included in a same reference pixel block have a same value for the distance in real space of the distance data, and accordingly, a problem may occur due to the difference of distances that actually exists but are not detected (see FIG. 14 to be described later).

However, since the distance data corresponding to a road marking point is corrected based on the luminance of pixels near this road marking points including this road marking point itself, the distance data of road marking points included in the same reference pixel block, can be corrected so as meet the real situation where the distance in real space increases as the position of a captured road marking point becomes upper over one of the image.

Thus, in the case of employing stereo matching as well, a road shape model can be generated more accurately according to the real road shape, and the advantages of the above aspects can be exhibited in a more accurate manner.

BRIEF DESCRIPTION OF THE DRAWINGS

FIG. 4B is a diagram representing a boundary set between the second farthest distance data and the third farthest distance data thereof, and the like;

FIG. 5 is a diagram representing a boundary moved and set between the third farthest distance data and the fourth farthest distance data, and the like;

FIG. 6 is a diagram representing a selected combination of approximation lines, a boundary, an intersection, and the like;

FIG. 8 is a diagram representing a selected combination of approximation lines as to the road in FIG. 19A, a boundary, an intersection, and the like;

FIG. 17A is a diagram representing multiple reference pixel blocks arrayed on horizontal lines j1 and j2 on a reference image, and the like, FIG. 17B is a diagram representing the edge intensity distribution of each pixel on the horizontal line j1, and FIG. 17C is a diagram representing the edge intensity distribution of each pixel on the horizontal line j2;

DESCRIPTION OF THE PREFERRED EMBODIMENTS

Embodiments of a road shape recognition device according to the present invention will be described below with reference to the drawings.

First Embodiment

Figure 1:
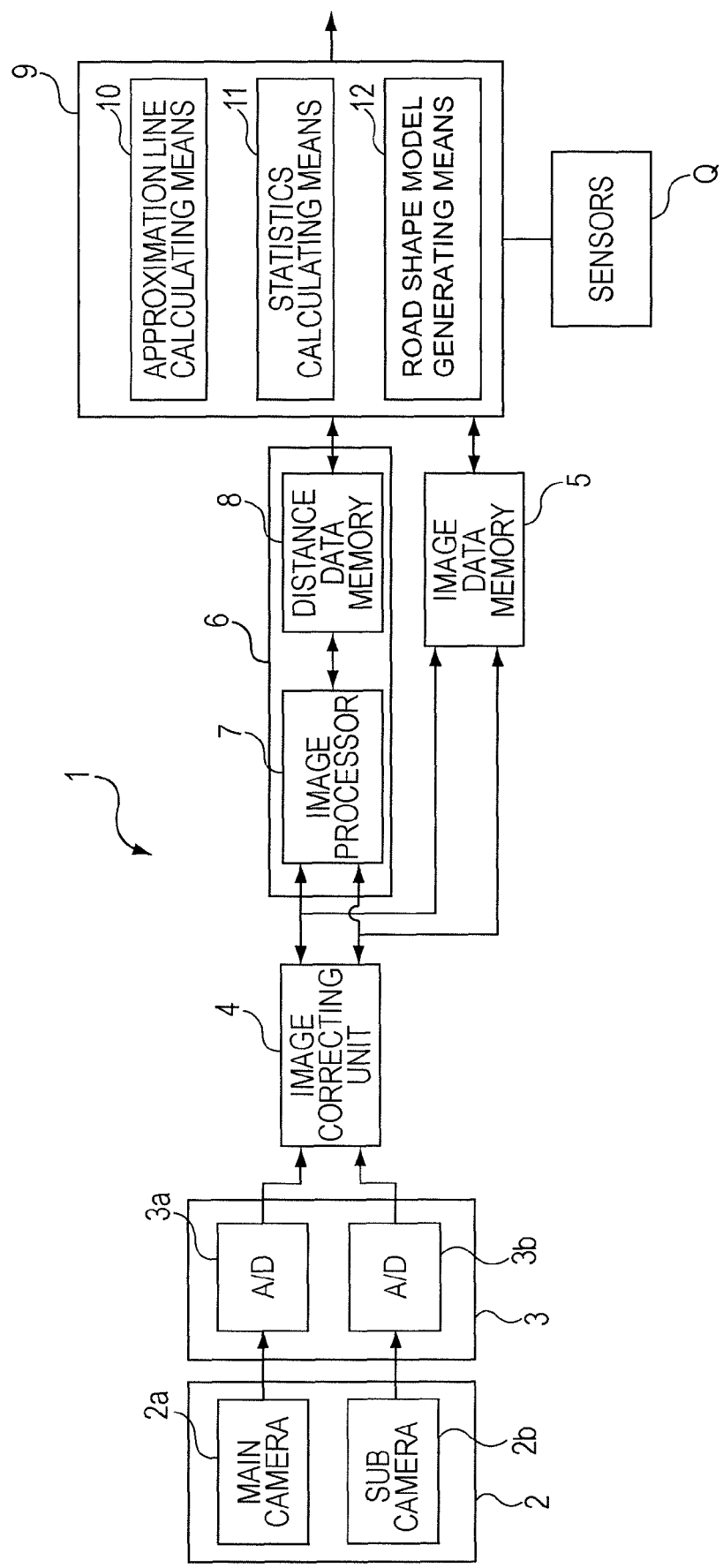
FIG. 1 is a block diagram illustrating the configuration of a road shape recognition device according to a first embodiment.

As shown in FIG. 1, a road shape recognition device 1 according to a first embodiment is configured of a processing unit 9 including image capturing means 2, distance and height detecting means 6, approximation line calculating means 10, statistics calculating means 11, and road shape model generating means 12, and so forth.

Note that the configuration of the upstream side of the processing unit 9 including the distance and height detecting means 6 and so forth is described in detail in JP-A Nos. 1994-266828 and 2001-092970, and so forth previously submitted by the present assignee, and see these publications for the detailed description of the configuration thereof. Brief description thereof will be made below.

According to the present embodiment, the image capturing means 2 is a stereo camera consisting of a main camera 2a on a driver side and a sub camera 2b on a front passenger sheet side which are attached near a room mirror of a vehicle at a predetermined distance in the vehicle-width direction. The main camera 2a and the sub camera 2b have an embedded image sensor such as CCD and CMOS sensor. The sensors of the main camera 2a and the sub camera 2b are configured so as to be mutually synchronized and capture images at a predetermined sampling cycle to output a pair of images.

Figure 2:
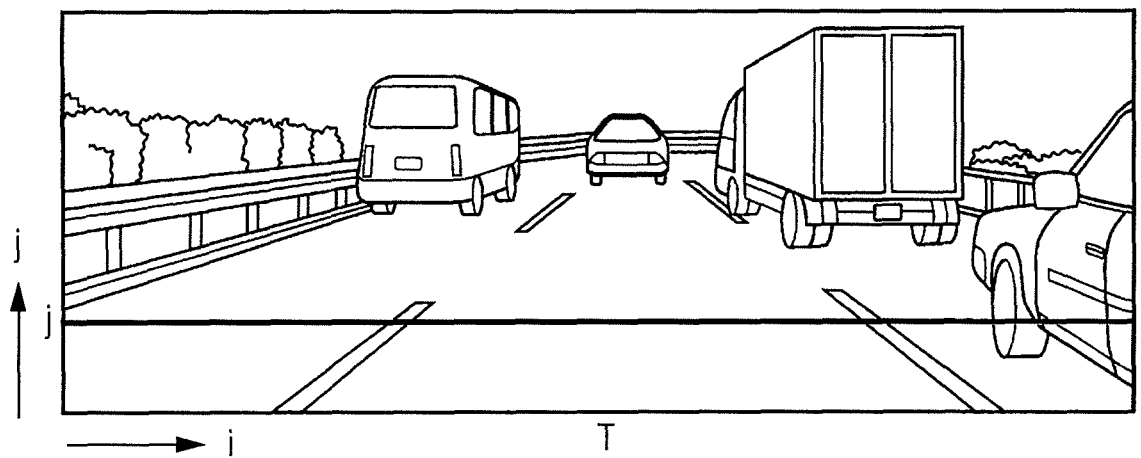
FIG. 2 is a diagram illustrating an example of one of images captured by image capturing means.

Now, hereinafter, one of the images, such as shown in FIG. 2, captured by the main camera 2a will be referred to as "reference image T", and the other image, not shown in the drawing, captured by the sub camera 2b will be referred to as "comparative image Tc". Description will be made below for a case where processing in the approximation line calculating means 10 and the like is performed using the reference image T, but the processing may be performed using the comparative image Tc, and the processing may also be arranged so that both images T and Tc are processed respectively.

Further, according to the present embodiment, the main camera 2a and the sub camera 2b of the image capturing means 2 are respectively configured so as to obtain monochrome image data, but image capturing means configured to capture color image data represented by RGB values or the like may be employed, and the present invention also applies to this case.

In the case that the reference image T and the like are captured by the main camera 2a or the like, as shown in FIG. 2, for example, image capturing is started from the leftmost pixel of each of the horizontal lines j on the reference image T or the like, and subsequently, scanning is sequentially performed in the right direction. Further, the image data regarding the luminance of each pixel in the reference image T or the like is sequentially transmitted to converting means 3 in the capturing order of the pixels while image capturing is executed such that the horizontal lines j to be scanned are sequentially switched from the lowermost line to the upward.

The converting means 3 is configured of a pair of analog-digital converters 3a and 3b. The converting means 3 sequentially converts the corresponding image data for each pixel of the reference image T or the like captured by the main camera 2a or sub camera 2b of the image capturing means 2 into the image data with a digital value serving as a luminance in 256 grayscale, and outputs the data to an image correcting unit 4.

Moreover, the image correcting unit 4 sequentially performs image correction as to each of the image data, such as elimination of shifting or noise, luminance correction, or the like, sequentially stores each of the image data in image data memory 5, and also sequentially transmits the data to the processing unit 9. In addition, the image correcting unit 4 also sequentially transmits each of the image data of the reference image T and the comparative image Tc which have been subjected to image correction to the distance and height detecting means 6.

The distance and height detecting means 6 include an image processor 7, and detects a plurality of distance data having at least information of distance Z and height Y in real space, at multiple mutually different points regarding an object including a road surface where a vehicle is traveling.

The image processor 7 of the distance and height detecting means 6 sequentially subjects the image data of the reference image T and the comparative image Tc to stereo matching or filtering processing to sequentially calculate a parallax dp for each pixel of the reference image T. Although not shown in the drawings, in stereo matching, a pixel block of which the luminance pattern is similar to that of a reference pixel block of a predetermined number of pixels such as 4×4 pixels or the like on the reference image T is determined on an epipolar line on the comparative image Tc, and the parallax dp is sequentially calculated for each pixel of the reference image T from the positions of the reference image T and the comparative image Tc thereof.

Now, hereinafter, an image wherein the parallax dp is assigned to each pixel of the reference image T (see FIG. 3) will be referred to as "distance image Tz." In addition, when, in real space, a point on a road surface immediately under the center between the pair of the above cameras 2a and 2b is taken as the origin, the vehicle-width direction of the vehicle (i.e., horizontal direction) as the X-axis direction, the vehicle-height direction (i.e., height direction) as the Y-axis direction, and the vehicle-length direction (i.e., distance direction) as the Z-axis direction, a point (X, Y, Z) in real space, the coordinates (i, j) of a pixel on the distance image Tz and a parallax dp can uniquely be correlated by coordinate conversion based on the triangulation principle represented with the following Expressions (1) through (3).

$$X = CD/2 + Z \times PW \times (i - IV) \quad (1)$$

$$Y = CH + Z \times PW \times (j - JV) \quad (2)$$

$$Z = CD/(PW \times (dp - DP)) \quad (3)$$

In the above Expressions, CD represents the distance between the pair of the cameras, PW represents the view angle per pixel, CH represents the attachment height of the pair of the cameras, IV and JV represent i coordinate and j coordinate on the distance image of the infinite point in the front of the vehicle, and DP represents the vanishing point parallax.

In filtering processing, when the similarity degree of luminance patterns between the reference pixel block of the reference image T and the pixel block of the comparative image Tc is low, the calculated parallax dp is determined as invalid, and the image processor 7 sequentially stores only parallaxes dp determined as valid to the distance data memory 8, and also transmits the valid parallaxes dp to the processing unit 9.

Note that, in the present embodiment, as described above, the main camera 2a and the sub camera 2b are provided as the image capturing means 2, and the distance and height detecting means 6 is configured so as to calculate the distance Z in real space (i.e., parallax dp) for each pixel of the reference image T by stereo matching as to the reference image T and the comparative image Tc captured by the main camera 2a and the sub camera 2b. However, the present invention is not limited thereto, and the image capturing means 2 may be output only one image T, like a monocular camera, for example.

In the present embodiment, as described above, the parallax dp is assigned to each pixel of the distance image Tz, the distance in real space Z is calculated in accordance with the above Expression (3) from the parallax dp, as appropriate, and the height Y and the horizontal position X in real space are used which are calculated from the coordinates (i, j) of a pixel on the distance image Tz, and the distance in real space Z in accordance with the above Expressions (1) and (2). However, the calculated (X, Y, Z) may be assigned to each pixel as distance data D beforehand, thereby generating the distance image Tz.

Further, the distance and height detecting means 6 may simply have a function capable of detecting multiple mutually different points by measuring or calculating distance data D having at least information of the distance Z and height Y in real space regarding an object including a road surface where the vehicle is traveling. Specifically, the distance and height detecting means 6 may be, a device which irradiates a laser beam in front of the vehicle to measure the distance data D of an object based on the information of the reflected light thereof, such as the above-mentioned laser radar distance measuring device, and the detection method thereof is not limited to a particular method.

In the present embodiment, the processing unit 9 is configured of a computer in which a central processing unit (CPU), a read only memory (ROM), a random access memory (RAM), an input/output interface, which are not shown in the drawings, and so forth are connected to a bus. The processing unit 9 includes approximation line calculating means 10, statistics calculating means 11, and road shape model generating means 12.

Note that the processing unit 9 may be configured so as to perform another processing such as detection of the preceding vehicle or the like. Also, the processing unit 9 is connected to sensors Q such as a speed sensor, a yaw rate sensor and a steering angle sensor for measuring the steering angle of a steering wheel, and so forth, whereby measured values such as a vehicle speed, a yaw rate and a steering angle are input to the processing unit 9.

The approximation line calculating means 10 is configured so as to divide a plurality of the distance data D into a group $G_1$ on the near side of the vehicle and a group $G_2$ on the far side of the vehicle based on the distance in real space Z (parallax dp) of the distance D detected by the distance and height detecting means 6. Subsequently, each time the distance data D of the boundary portion between the two groups $G_1$ and $G_2$ is transferred from one of the groups to the other, the approximation line calculating means 10 calculates the corresponding approximation lines $L_1$ and $L_2$ for the groups $G_1$ and $G_2$ respectively which approximate the plurality of the distance data D belonging to the groups $G_1$ and $G_2$.

In the present embodiment, the approximation line calculating means 10 uses the least square method to calculate the corresponding approximation lines $L_1$ and $L_2$ for the groups $G_1$ and $G_2$ respectively which approximate the distance data D belonging to the groups $G_1$ and $G_2$.

Note that in the case that each of the distance data D is represented with (Z, Y), and an approximation line is calculated with the following expression, $$Y=aZ+b \quad (4)$$

as is generally known in the art, the least square method calculates a and b with the following expressions.

$$a=(n\Sigma ZY-\Sigma Z\cdot \Sigma Y)/\{n\Sigma Z^2-(\Sigma Z)^2\} \quad (5)$$

$$b=(\Sigma Z^2\cdot \Sigma Y-\Sigma ZY\cdot \Sigma Z)/\{n\Sigma Z^2-(\Sigma Z)^2\} \quad (6)$$

where n represents the number of the distance data D of a group, and the summation Σ performs regarding all of the distance data D within the group.

In the present embodiment, the division of the groups $G_1$ and $G_2$ and calculation of the approximation lines $L_1$ and $L_2$ in the approximation line calculating means 10 are preformed as follows.

The approximation line calculating means 10 first searches the inside of the distance image Tz detected by the distance and height detecting means 6. Each time a pixel including the distance data D is found out, the approximation line calculating means 10 calculates the distance Z and height Y in real space of the distance data D Subsequently, based on the above information, the approximation calculating means 10 calculates the $Z^2$ and ZY necessary to perform the above Expressions (5) and (6), and assign the resultants to the distance data D along with the distance Z and the height Y.

Figure 4A:
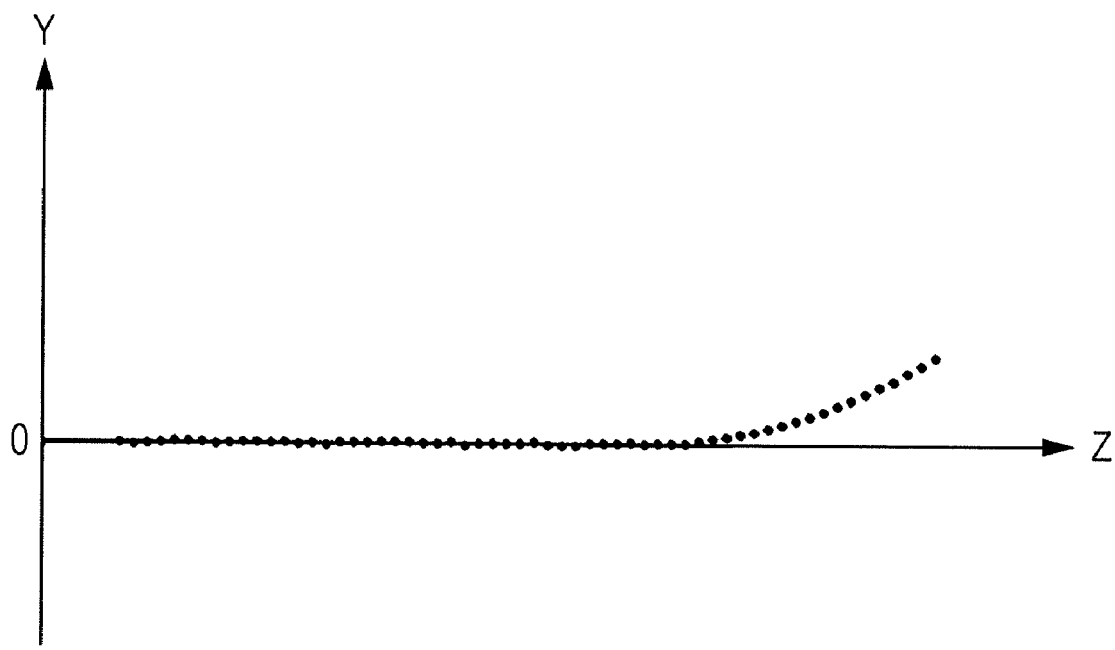
FIG. 4A is a diagram representing a Z-Y plane where the distance and height in real space of each of distance data corresponding to the road in FIG. 18A are plotted.
Figure 18A:
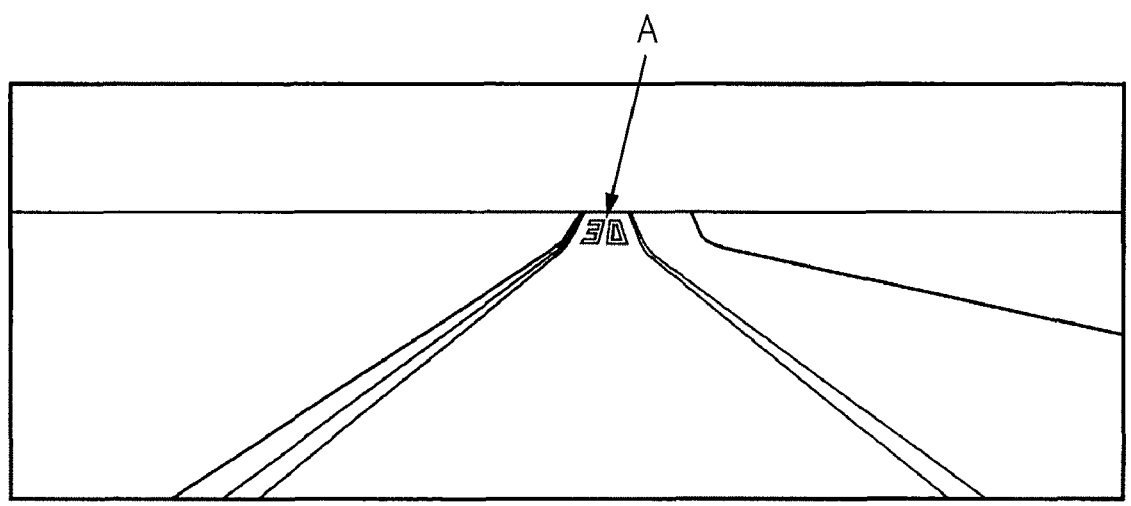
FIG. 18A is a diagram representing a road having a uphill in the distance.
Figure 18B:
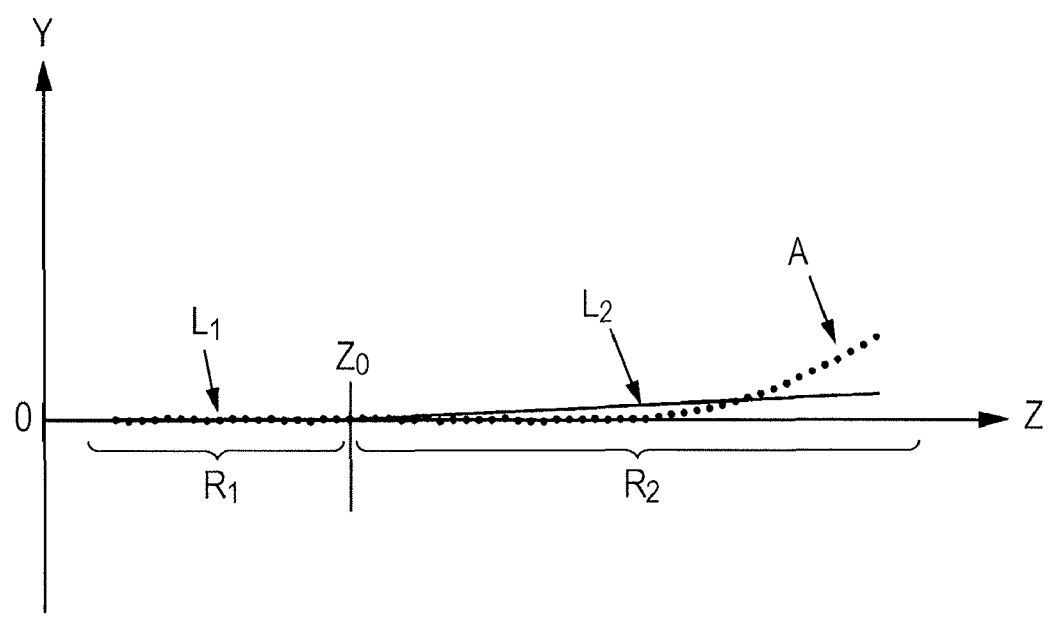
FIG. 18B is a diagram representing a road shape model wherein the road shape in FIG. 18A is subjected to linear approximation with the boundary between sections being fixed.

For example, in a situation shown in FIG. 18A where a road having a uphill A in the distance is captured as the reference image T, as described above, a plotting result shown in FIG. 4A is obtained by plotting the distance Z and height Y in real space of the distance data D calculated by the approximation line calculating means 10 on a distance-height plane (Z-Y plane). Note that the plotting result shown in FIG. 4A is the same as the plotting result shown in FIG. 18B.

Figure 4B:
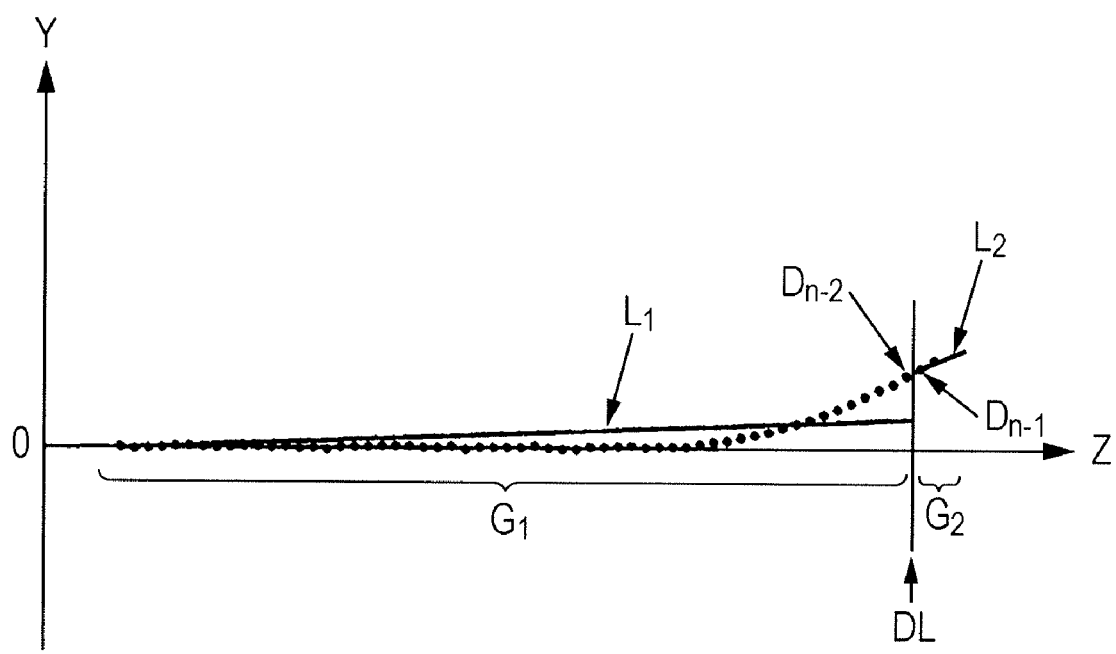

Subsequently, as shown in FIG. 4B, among the plurality of the distance data D, the approximation line calculating means 10 sets a boundary DL between distance data $D_{n-1}$ of which the distance in real space Z is the second farthest, and distance data $D_{n-2}$ of which the distance in real space Z is the third farthest, and divides the plurality of the distance data D into a group $G_1$ on the near side of the vehicle (Z=0) and a group $G_2$ on the far side of the vehicle (Z=0). The group $G_1$ consists of n−2 distance data D from the distance data $D_1$ of which the distance in real space Z is the nearest to the third farthest distance data $D_{n-2}$, while the group $G_2$ on the far side of the vehicle (Z=0) consists of two distance data D, the distance data $D_{n-1}$ of which the distance in real space Z is the second farthest and the farthest distance data $D_n$.

Subsequently, the approximation line calculating means 10 calculates the approximation lines $L_1$ and $L_2$ for the groups $G_1$ and $G_2$ respectively for approximating the plurality of the distance data D belonging the groups $G_1$ and $G_2$. Specifically, the approximation line calculating means 10 performs linear approximation as to n−2 distance data D of the distance data $D_1$ through $D_{n-2}$ in the group $G_1$, and performs linear approximation as to two distance data D of the distance data $D_{n-1}$ and $D_n$ in the group $G_2$, thereby calculating the approximation lines $L_1$ and $L_2$ for the groups $G_1$ and $G_2$ respectively.

In so doing, the approximation line calculating means 10 calculates the summations ΣZ, ΣY, $\Sigma Z^2$ and ΣZY of the distance Z, height Y, $Z^2$, and ZY in real space calculated for each of the distance data $D_1$ through $D_{n-2}$ belonging to the group $G_1$, and substitutes the resultants into the Expressions (5) and (6) to perform the Expression $Y=a_1Z+b_1$ to obtain the approximation line $L_1$. Similarly, with regard to the group $G_2$, the approximation line calculating means 10 calculates the summations $\Sigma Z$, $\Sigma Y$, $\Sigma Z^2$ and $\Sigma ZY$ of the Z, Y, $Z^2$ and ZY calculated regarding each of the distance data $D_{n-1}$ and $D_n$ belonging to the group $G_2$, and substitutes the resultants into the Expressions (5) and (6) to perform the expression $Y=a_2Z+b_2$ to obtain the approximation line $L_2$.

The approximation line calculating means 10 stores information such as the position of the boundary DL dividing the groups $G_1$ and $G_2$, and so forth, and the $a_1$, $b_1$, $a_2$ and $b_2$ of the calculated approximation lines $L_1$ and $L_2$ in storage means not shown in the drawings in a correlating manner.

Figure 5:
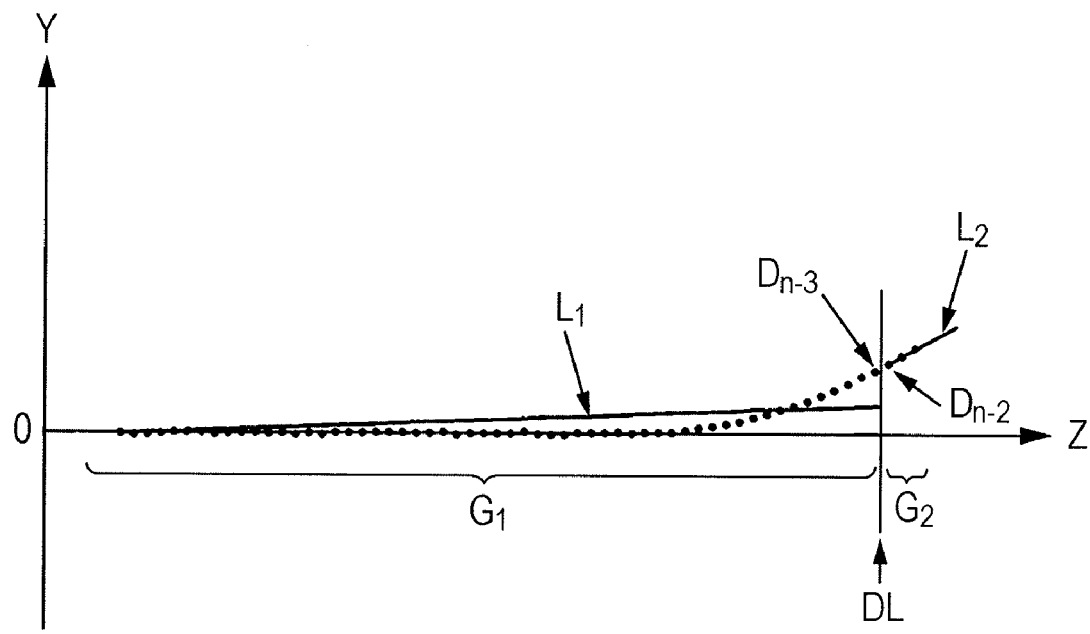

Next, the approximation line calculating means 10 transfers the distance data $D_{n-2}$ representing the boundary DL portion from the group $G_1$ to the group $G_2$, and moves the position of the boundary DL for dividing the groups $G_1$ and $G_2$ towards the near side, i.e., the vehicle (Z=0) side by one data, as shown in FIG. 5. Specifically, the approximation line calculating means 10 sets the boundary DL between the distance data $D_{n-2}$ of which the distance in real space Z is the third farthest and the distance data $D_{n-3}$ of which the distance in real space Z is the fourth farthest.

Subsequently, the approximation line calculating means 10 subtracts the $Z_{n-2}$, $Y_{n-2}$, $Z_{n-2}^2$ and $Z_{n-2}Y_{n-2}$ corresponding to the distance data $D_{n-2}$ from the summations $\Sigma Z$, $\Sigma Y$, $\Sigma Z^2$ and $\Sigma ZY$ respectively regarding each of the above-calculated distance data $D_1$ through $D_{n-2}$ belonging to the group $G_1$, thereby calculating the summations $\Sigma Z$, $\Sigma Y$, $\Sigma Z^2$ and $\Sigma ZY$ regarding the distance data $D_1$ through $D_{n-3}$ belonging to the group $G_1$.

With regard to the group $G_2$, the approximation line calculating means 10 adds the $Z_{n-2}$, $Y_{n-2}$, $Z_{n-2}^2$ and $Z_{n-2}Y_{n-2}$ corresponding to the distance data $D_{n-2}$ to the summations $\Sigma Z$, $\Sigma Y$, $\Sigma Z^2$ and $\Sigma ZY$ respectively regarding each of the above-calculated distance data $D_{n-1}$ and $D_n$ belonging to the group $G_2$, thereby calculating the summations $\Sigma Z$, $\Sigma Y$, $\Sigma Z^2$ and $\Sigma ZY$ regarding each of the distance data $D_{n-2}$ and $D_n$ belonging to the group $G_2$.

Specifically, the distance data of the boundary DL portion to be transferred is represented as Da, the distance in real space thereof is represented as Za, and height thereof is represented as Ya. Then, each time the distance data Da is transferred from the group $G_1$ to the group $G_2$, the Za, Ya, $Za^2$ and ZaYa corresponding to the distance data Da are subtracted from the summations $\Sigma Z$, $\Sigma Y$, $\Sigma Z^2$ and $\Sigma ZY$ of the group $G_1$ respectively, and added to the summations $\Sigma Z$, $\Sigma Y$, $\Sigma Z^2$ and $\Sigma ZY$ of the group $G_2$ respectively, whereby the summations $\Sigma Z$, $\Sigma Y$, $\Sigma Z^2$ and $\Sigma ZY$ of each of the groups $G_1$ and $G_2$ can readily be calculated at a high speed.

After transferring the distance data $D_{n-2}$ from the group $G_1$ to the group $G_2$ and calculating the summations $\Sigma Z$, $\Sigma Y$, $\Sigma Z^2$ and $\Sigma ZY$ of the groups $G_1$ and $G_2$, in the same way as described above, the approximation line calculating means 10 substitutes the summations into the above Expressions (5) and (6) to perform the expression $Y=a_1Z+b_1$ for the approximation line $L_1$ and the expression $Y=a_2Z+b_2$ for the approximate line $L_2$, and stores information such as the position of the boundary DL for dividing the groups $G_1$ and $G_2$, and so forth, and the $a_1$, $b_1$, $a_2$ and $b_2$ of the calculated approximation lines $L_1$ and $L_2$ in the storage means in a correlating manner.

The approximation line calculating means 10 performs this calculation processing of the approximation lines $L_1$ and $L_2$ each time the distance data Da of the boundary DL portion is transferred from the group $G_1$ to the group $G_2$.

Note that, in the above configuration example, description has been made regarding a case where the position of the boundary DL for dividing the groups $G_1$ and $G_2$ is set to the farthest side from the vehicle, the calculation processing of the approximation lines $L_1$ and $L_2$ is performed while moving the position of the boundary DL in a direction approaching to the vehicle. Conversely, arrangement may be made wherein the position of the boundary DL is set to the nearest side from the vehicle, i.e., between the distance data $D_2$ of which the distance in real space Z is the second nearest and the third nearest distance data $D_3$, and the calculation processing of the approximation lines $L_1$ and $L_2$ may be performed while moving the position of the boundary DL in a direction receding from the vehicle.

In this case as well, each time the distance data Da of the boundary portion is transferred from the group $G_2$ to the group $G_1$, the Za, Ya, $Za^2$ and ZaYa corresponding to the distance data Da are added to the summations $\Sigma Z$, $\Sigma Y$, $\Sigma Z^2$ and $\Sigma ZY$ of the group $G_1$ respectively, and subtracted from the summations $\Sigma Z$, $\Sigma Y$, $\Sigma Z^2$ and $\Sigma ZY$ of the group $G_2$ respectively, whereby the summations $\Sigma Z$, $\Sigma Y$, $\Sigma Z^2$, and $\Sigma ZY$ of the groups $G_1$ and $G_2$ can readily be calculated at a high speed.

Figure 3:
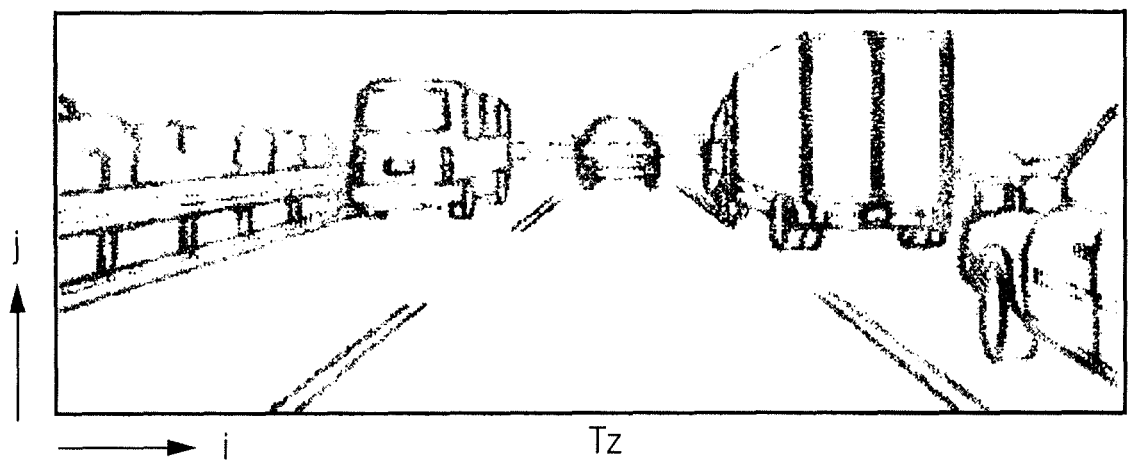
FIG. 3 is a diagram illustrating an example of a created distance image.

In the case that the distance image Tz is an image shown in FIG. 3, the distance data D of a three-dimensional object above a road surface such as a vehicle, a guardrail, or the like also exists within the distance image Tz. If the distance data D of such a three-dimensional object is subjected to linear approximation, a road shape model to be generated based on the approximation lines $L_1$ and $L_2$ may not accurately reflect the road surface shape, as described later. In addition, if the entirety of the distance image Tz is searched, the calculation load of the approximate lines $L_1$ and $L_2$ may be large.

Therefore, in the present embodiment, among the plurality of the distance data D detected by the distance and height detecting means 6, the position of a road shape model at a current sampling cycle is estimated from a subsequent behavior of the vehicle based on the road shape models generated at the past sampling cycles such the last sampling cycle and the like. Subsequently, linear approximation is performed only as to the plurality of the distance data D included in a predetermined range from the position of the estimated road shape model, i.e., for example, only the plurality of the distance data D included in a range up to a position apart by a predetermined distance in the vertical direction (i.e., height Y direction) from the position of the estimated road shape model.

Thus configured, a road shape model to be generated from the approximation lines $L_1$ and $L_2$ calculated based on the limited plurality of the distance data D accurately reflects the shape of the road surface, while the search range as to the distance image Tz is limited and thus the calculation load of the approximation lines $L_1$ and $L_2$ can be relieved.

When the approximation line calculating means 10 transfers the distance data Da of the boundary DL portion from the group $G_1$ to the group $G_2$ and calculates the summations $\Sigma Z$, $\Sigma Y$, $\Sigma Z^2$ and $\Sigma ZY$ of each of the groups $G_1$ and $G_2$, thereby calculating the approximation lines $L_1$ and $L_2$, as described above, the statistics calculating means 11 calculates statistics for each of the groups $G_1$ and $G_2$ based on the calculated approximation lines $L_1$ and $L_2$. The statistics calculating means 11 performs this statistics calculating processing each time the distance Da of the boundary DL portion is transferred from the group $G_1$ to the group $G_2$.

In the present embodiment, as statistics, the variances $\sigma_1^2$ and $\sigma_2^2$ of the distance data D of the groups $G_1$ and $G_2$ as to the approximation lines $L_1$ and $L_2$ are calculated for the groups $G_1$ and $G_2$ respectively with the following Expressions (7) and (8).

$$\sigma_1^2 = \Sigma\{(a_1Z+b_1)-Y\}^2/n_1 \quad (7)$$

$$\sigma_2^2 = \Sigma\{(a_2Z+b_2)-Y\}^2/n_2 \quad (8)$$

Note that $n_1$ and $n_2$ represent the number of the distance data D belonging to the groups $G_1$ and $G_2$, respectively. Instead of the variance $\sigma^2$, the standard deviation of the distance data D belonging to the groups $G_1$ and $G_2$ may be calculated for the groups $G_1$ and $G_2$ as statistics.

The statistics calculating means 11 stores the variances $\sigma_1^2$ and $\sigma_2^2$ calculated for $G_1$ and $G_2$ respectively in the storage means in a manner correlating with the information of the position of the boundary DL for dividing the groups $G_1$ and $G_2$ set by the approximation line calculating means 10, the $a_1$, $b_1$, $a_2$ and $b_2$ of the calculated approximation lines $L_1$ and $L_2$, and so forth.

The road shape model generating means 12 selects a combination out of the combinations of the approximation lines $L_1$ and $L_2$ of the two groups $G_1$ and $G_2$ calculated each time the distance data Da of the boundary DL portion is transferred from the group $G_1$ to the group $G_2$ by the approximation line calculating means 10 as described above. Then the road shape model generating means 12 generates a road shape model using the selected combination of the approximation lines $L_1$ and $L_2$ as at least a shape on a distance-height plane (Z-Y plane).

In the present embodiment, the road shape model generating means 12 selects a combination of the approximation lines $L_1$ and $L_2$ that minimizes the total sum of the statistics of the two group $G_1$ and $G_2$ calculated at the statistics calculating means 11, i.e., the total value of the variances $\sigma_1^2$ and $\sigma_2^2$ as to the approximation lines $L_1$ and $L_2$ of the distance data D belonging to the groups $G_1$ and $G_2$.

Figure 6:
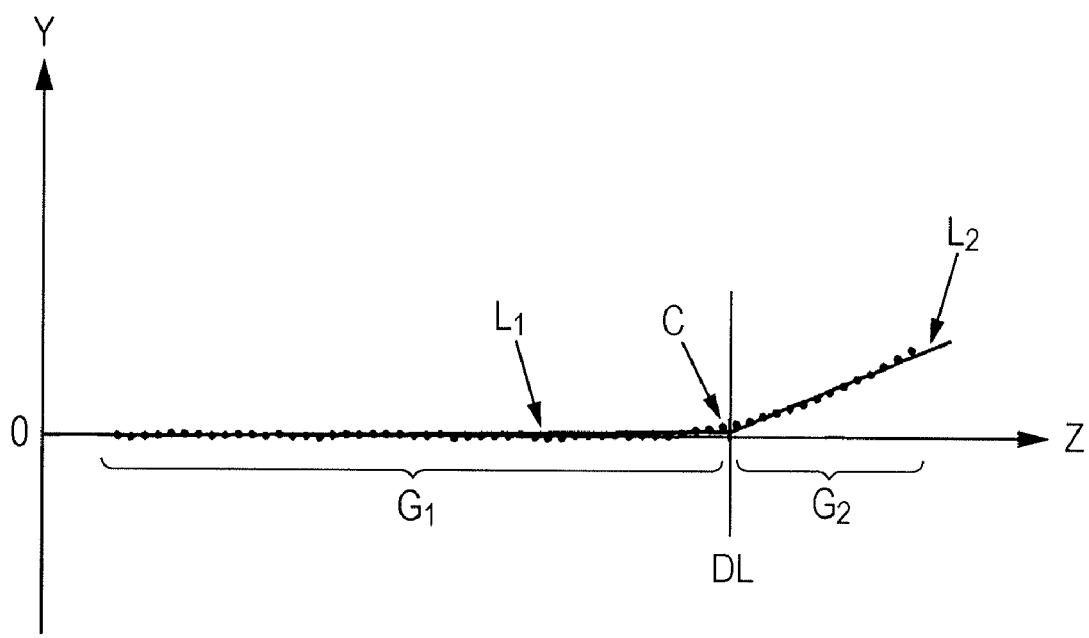

For example, regarding the distance data D plotted on a Z-Y plane as shown in FIG. 4A, the road shape model generating means 12 selects a combination of the approximation lines $L_1$ and $L_2$ shown in FIG. 6, and generates a road shape model as a shape on a distance-height plane (Z-Y plane). Specifically, in this case, a road shape model is generated with the approximation line $L_1$ as a model in a range from the vehicle (Z=0) to the boundary DL, and the approximation line $L_2$ as a model in a range farther than the boundary DL.

Further, in the present embodiment, as shown in FIG. 6, the road shape model generating means 12 replaces the portion of an intersection C of the selected approximation lines $L_1$ and $L_2$ of the two groups $G_1$ and $G_2$ with an easement curve the tangent lines of which are the approximation lines $L_1$ and $L_2$, thereby correcting the generated road shape models $L_1$ and $L_2$.

Figure 7:
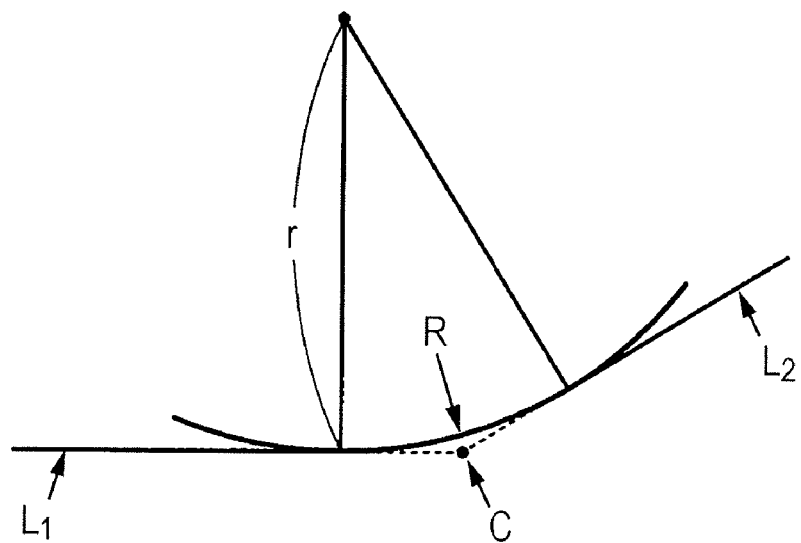
FIG. 7 is a diagram representing an arc that is an easement curve the tangent lines of which are the approximation lines.

In the present embodiment, an arc R such as shown in FIG. 7 is employed as an easement curve. Alternatively, the easement curve may also be a quadratic curve or the like. In the case of employing the arc R as an easement curve, the curvature radius r thereof may be be a fixed value set beforehand, or may be vary depending on the difference between the inclinations $a_1$ and $a_2$ of the approximation lines $L_1$ and $L_2$, the setting speed for the road where the vehicle is traveling, or the like. Further, the curvature radius r may be changed variably such that an optimal curvature radius r is calculated based on the variance as to the arc R of the plotted distance data D or the like.

Next, the operation of the road shape recognition device 1 according to the present embodiment will be described.

For example when a road having a uphill A in the distance shown in FIG. 18A is captured as the reference image T, the road shape models $L_1$ and $L_2$ shown in FIG. 6 (accurately, road shape models with the approximation line $L_1$, easement curve, and approximation line $L_2$ as models) are ultimately generated based on each of the distance data D shown in FIG. 4A, according to the method shown in FIGS. 4B and 5.

Figure 19A:
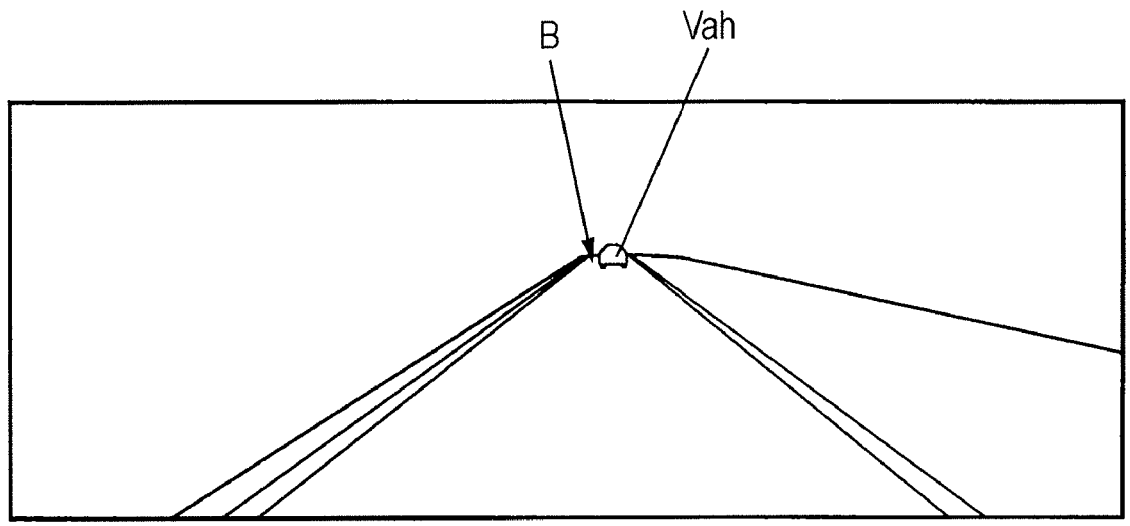
FIG. 19A is a diagram representing a road where a preceding vehicle is traveling on a distant downhill.
Figure 19B:
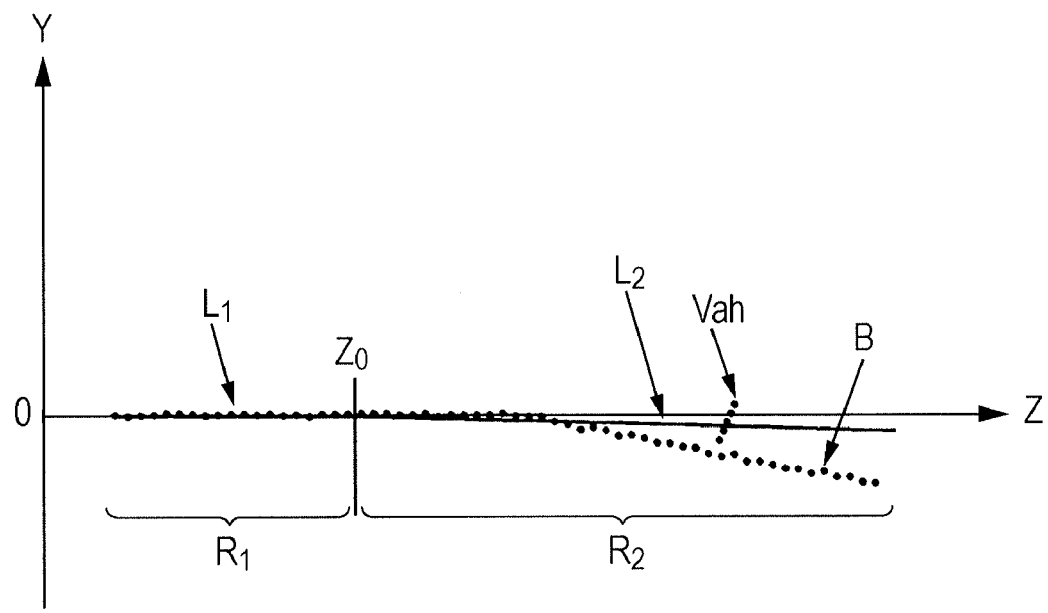
FIG. 19B is a diagram representing a road shape model wherein the road shape in FIG. 19A is subjected to linear approximation with the boundary between sections being fixed.

In addition, when there is a downhill B in the distance and a preceding vehicle Vah is traveling on the downhill B thereof as shown in FIG. 19A, by considering as linear approximation objects only the distance data D included in a predetermined range in the vertical direction from the position of a road shape model at a current sampling cycle estimated from the road shape models generated at the past sampling cycles like the present embodiment, the distance data D corresponding to the preceding vehicle Vah in the distance data D shown in FIG. 19B is excluded, and only the distance data D corresponding to the road surface are subject to linear approximation.

Subsequently, by the same way shown in FIGS. 4B and 5, each time the approximation line calculating means 10 transfers the distance data Da of the boundary DL portion from the group $G_1$ to the group $G_2$, the Za, Ya, $Za^2$ and ZaYa corresponding to the distance data Da are subtracted from the summations $\Sigma Z$, $\Sigma Y$, $\Sigma Z^2$ and $\Sigma ZY$ of the group $G_1$ respectively, and added to the summations $\Sigma Z$, $\Sigma Y$, $\Sigma Z^2$ and $\Sigma ZY$ of the group $G_2$ respectively, and the summations are substituted into the above Expressions (5) and (6) to perform the expression Y=aZ+b for the approximation lines $L_1$ and $L_2$.

Subsequently, each time the approximation line calculating means 10 transfers the distance data Da of the boundary DL portion from the group $G_1$ to the group $G_2$ to perform the expression for the approximation lines $L_1$ and $L_2$, the statistics calculating means 11 calculates the variances $\sigma_1^2$ and $\sigma_2^2$ as to the approximation lines $L_1$ and $L_2$ of distance data D belonging the groups $G_1$ and $G_2$ respectively. Subsequently, when transferring of the distance data Da of the boundary DL portion is completed, the road shape model generating means 12 selects a combination of the approximation lines $L_1$ and $L_2$ that minimizes the total sum of the variances $\sigma_1^2$ and $\sigma_2^2$.

Figure 8:
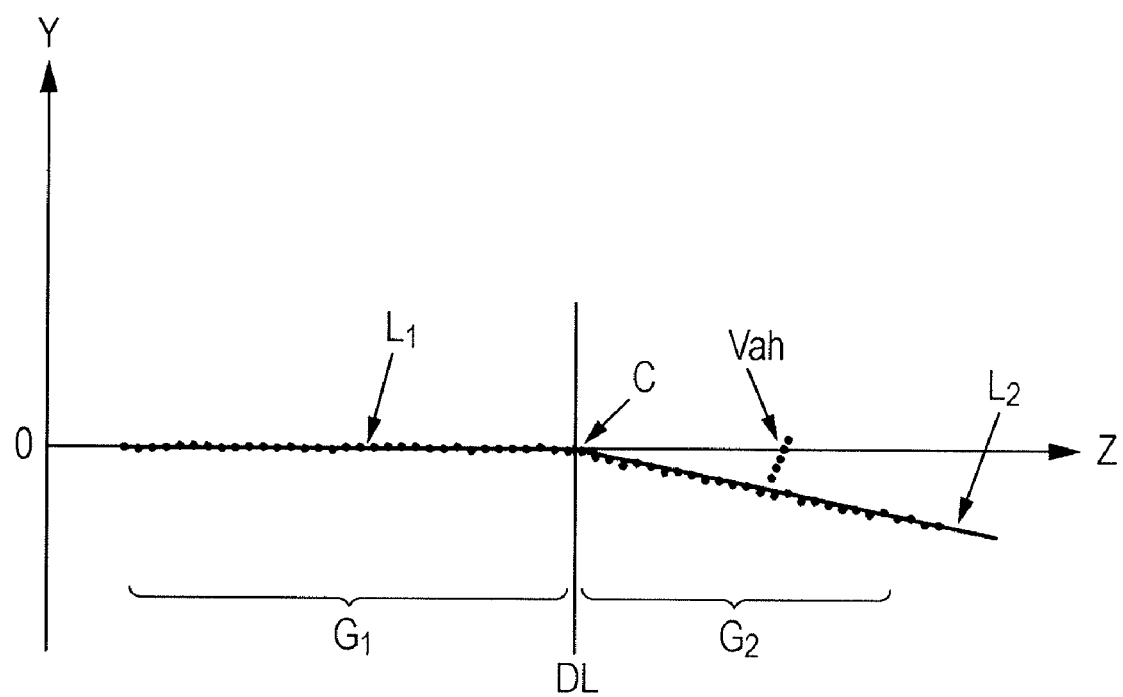

In this way, the road shape models $L_1$ and $L_2$ are ultimately generated as shown in FIG. 8. Note that, the arc R that is an easement curve is omitted in FIG. 8. Furthermore, as shown in FIG. 8, the road shape models $L_1$ and $L_2$ are generated, clearly separated from the distance data D corresponding to the preceding vehicle Vah.

As described above, with the road shape recognition device 1 according to the present embodiment, the distance data D including information of the distance Z and height Y in real space is detected regarding a road surface where a vehicle is traveling, the distance data D is divided into the group $G_1$ on the near side of the vehicle and the group $G_2$ on the far side of the vehicle, and the approximation lines $L_1$ and $L_2$ for approximating the distance data D are calculated for the groups $G_1$ and $G_2$ respectively while moving the boundary DL as a variable.

Subsequently, for each of the groups $G_1$ and $G_2$, statistics based on the respective approximation lines $L_1$ and $L_2$, i.e., for example, the variances $\sigma_1^2$ and $\sigma_2^2$ as to the approximation lines $L_1$ and $L_2$ of the distance data D belonging to each of the groups $G_1$ and $G_2$ are calculated, and based on the statistics thereof, for example, a combination of the approximation lines $L_1$ and $L_2$ is selected that minimizes the total sum thereof to generate a road shape model.

Upon the real road design, a road shape on the distance-height plane (longitudinal linear shape) is comprised of two straight lines and an easement curve. However, with the road shape recognition device 1 according to the present embodiment, a road shape model can be generated from a combination of the two approximation lines $L_1$ and $L_2$ (or a combination of these and an easement curve) in line with the real road design thereof, and a road shape can accurately be recognized.

Also, when the approximation line calculating means 10 calculates the approximation lines $L_1$ and $L_2$, the expression for the approximation lines $L_1$ and $L_2$ can be performed, for example, simply by using the least square method, subtracting the Za, Ya, $Za^2$ and ZaYa corresponding to the distance data Da from the summations EZ, EY, $EZ^2$, and EZY of one of the groups respectively, and adding Za, Ya, $Za^2$ and ZaYa corresponding to the distance data Da to the summations ΣZ, ΣY, ΣZ² and ΣZY of the other group respectively each time the distance data Da of the boundary DL portion of each of the groups $G_1$ and $G_2$ of the distance data D is transferred from one of the groups to the other group. Accordingly, the calculation of the approximation lines $L_1$ and $L_2$ can readily be performed at a high speed.

Further, the distance data D serving as a calculation object of the approximation lines $L_1$ and $L_2$ at the approximation line calculating means 10 is limited to distance data D included in a predetermined range from the position of a road shape model at a current sampling cycle that is estimated from the road shape models generated at the past sampling cycles and a subsequent behavior of the vehicle, whereby the calculation of the approximation lines $L_1$ and $L_2$ can be performed in a state in which a three-dimensional object existing above a road surface such as the preceding vehicle Vah or the like is eliminated.

Therefore, a road shape model generated from the approximation lines $L_1$ and $L_2$ thus calculated can accurately reflect the shape of the real road surface, and also the search range of the distance data D is limited, and accordingly, the processing speed can be increased by relieving the calculation load of the approximation lines $L_1$ and $L_2$.

Second Embodiment

With the above first embodiment, description has been made for calculating the approximation lines $L_1$ and $L_2$ with all of the distance data D of which at least the distance Z and height Y in real space have been detected by the distance and height detecting means 6, or distance data D of those included in a predetermined range from the position of a road shape model at a current sampling cycle estimated from the past sampling cycles and a subsequent behavior of the vehicle, and so forth.

However, the road shape model may be generated by detecting a marking such as a lane line lateral to the vehicle, and further, a numeral representing the legal speed limit displayed on a road surface, an arrow indicating the traveling direction, and using the distance data D corresponding to the detected marking. With the second embodiment, a road shape recognition device thus configured will be described.

Figure 9:
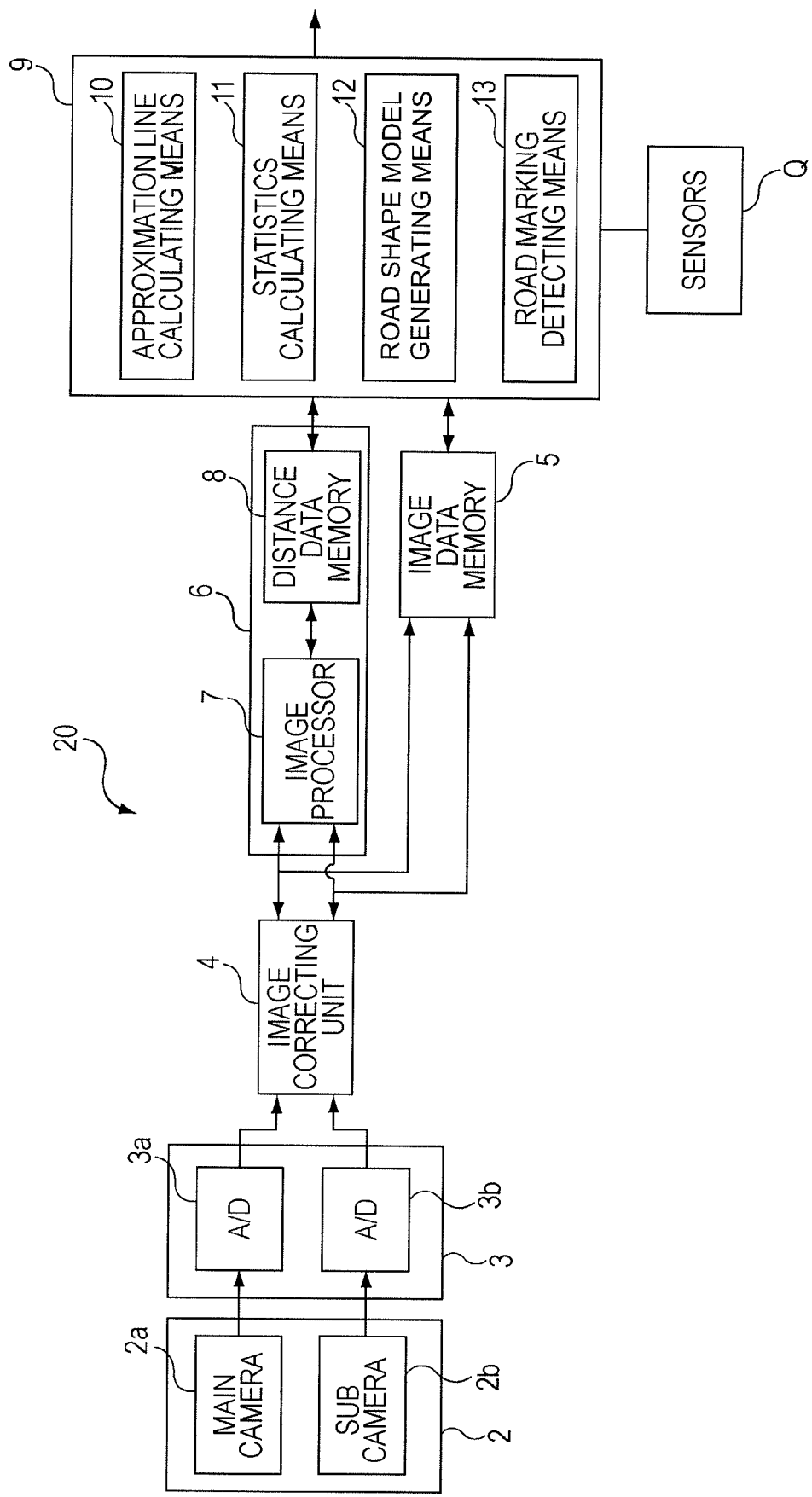
FIG. 9 is a block diagram illustrating the configuration of a road shape recognition device according to a second embodiment.

As shown in FIG. 9, a road shape recognition device 20 according to the second embodiment is configured of a processing unit 9 including image capturing means 2, distance and height detecting means 6, approximation line calculating means 10, statistics calculating means 11, and road shape model generating means 12, and so forth. These configurations are same as the case of the road shape recognition device 1 according to the first embodiment. In the present embodiment, the processing unit 9 is further provided with road marking detecting means 13 that detects a marking on a road surface, including lane lines lateral to the vehicle.

Note that, in the present embodiment as well, the main camera 2a and the sub camera 2b are provided as the image capturing means 2, the parallax dp, i.e., the distance in real space Z is calculated regarding each pixel of the reference image T by stereo matching as to the reference image T and the comparative image Tc by the distance and height detecting means 6, but the present embodiment is not limited to this and the detection method is not limited to a particular method, and any method can be employed as long as the method can detect the distance Z and height Y in real space of a marking such as a lane line, a numeral and an arrow marked on a road surface.

In the same way as the first embodiment, the present embodiment uses the main camera 2a and the sub camera 2b, each of which an image sensor such as a CCD or the like is housed as the image capturing means 2. When the reference image T and the comparative image Tc are captured by these, as shown in FIG. 2, image capturing is started from the leftmost pixel of each of the horizontal lines j on the reference image T or the like, and subsequently, scanning is sequentially performed in the right direction. Further, the corresponding image data regarding the luminance p of each pixel in the reference image T or the like is sequentially transmitted to converting means 3 in the capturing order of the pixels so as to be imaged while image capturing is executed such that the horizontal lines j to be scanned are switched from the lowermost line to the upward.

Subsequently, the image data of the luminance p of each pixel on the reference image T or the like is sequentially converted into the luminance p of a digital value in 256 grayscale by the converting means 3 for example, sequentially subjected to image correction at the image correcting unit 4, and sequentially stored in the image data memory 5, as well as sequentially transmitted to the processing unit 9. In the same way as the first embodiment, these image data are also sequentially transmitted to the distance and height detecting means 6.

In the present embodiment, the road marking detecting means 13 detects a marking on a road surface such as a lane line or the like based on the luminance p that is the image data of each pixel on the reference image T to be sequentially transmitted.

Figure 10:
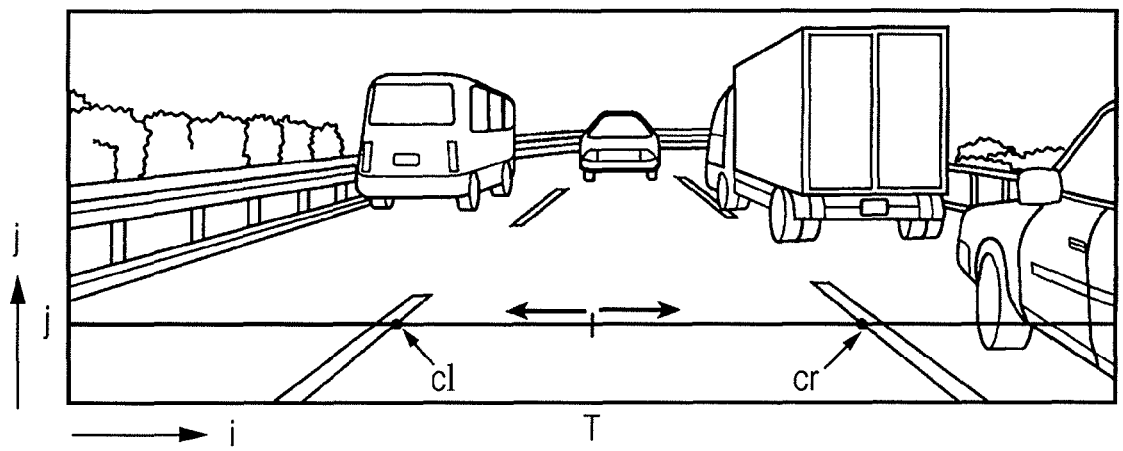
FIG. 10 is a diagram for describing an example of search on the horizontal line of a reference image, and a detected road marking point.

Specifically, when one line's worth of the luminance p of each pixel of the horizontal lines j on the reference image T is input, the road marking detecting means 13 detects the luminance p of each pixel while searching on the horizontal lines j in the horizontal direction from the central position of the reference image T, as shown in FIG. 10 for example. In this searching, when the horizontal lines j are searched in the right direction for example, the luminance p of each pixel greatly increases at a portion representing a marking such as a lane line colored in white or the like on a road surface.

Therefore, the road marking detecting means 13 detects pixels cl and cr (see FIG. 10) the luminance p of which greatly increases, and the difference Δp of which as to the luminance p of an adjacent pixel (hereafter, referred to as "edge intensity Δp") is equal to or greater than a predetermined threshold Δpth, as road marking points corresponding to markings such as lane lines or the like displayed on a road surface. As the road marking points cl and cr for each of the horizontal lines j, a great number of road marking points cl and cr corresponding to edge portions of lane lines or the like within the reference image T are detected.

Further, with regard to the great number of road marking points cl and cr detected by the road marking detecting means 13, the approximation line calculating means 10 calculates the distance Z and height Y in real space in accordance with the above Expressions (1) through (3) based on the parallax dp detected by the distance and height detecting means 6, and the like, and, as shown in the first embodiment, calculates the approximation lines $L_1$ and $L_2$ for the groups $G_1$ and $G_2$ respectively using the respective distance data D of the road marking points cl and cr which have at least the distance Z and height Y in real space.

Subsequently, in the same way as the first embodiment, each time the approximation line calculating means 10 calculates the approximation lines $L_1$ and $L_2$, the statistics calculating means 11 calculates statistics based on the approximation lines $L_1$ and $L_2$, i.e., for example, the variances $\sigma_1^2$ and $\sigma_2^2$ of the distance data D of the groups $G_1$ and $G_2$ as to the approximation lines $L_1$ and $L_2$ for the groups $G_1$ and $G_2$ respectively.

Subsequently, the road shape model generating means 12 selects a combination out of the combinations of the approximation lines $L_1$ and $L_2$ of the two groups $G_1$ and $G_2$ based on the calculated statistics of the two groups $G_1$ and $G_2$ (e.g., variances $\sigma_1^2$ and $\sigma_2^2$), and uses the selected combination of the approximation lines $L_1$ and $L_2$ to generate road shape models $L_1$ and $L_2$ (or road shape models with the approximation line $L_1$, easement curve, and approximation line $L_2$ as models) as a shape at least on a distance-height plane (Z-Y plane).

As described above, the road shape recognition device 20 according to the present embodiment provides the same advantages of the road shape recognition device 1 according to the first embodiment. Further, in the present embodiment, since a road shape model is generated by detecting the road marking points cl and cr corresponding to markings on a road surface such as lane lines or the like with the road marking detecting means 13 detects, calculating the approximation lines $L_1$ and $L_2$ and the like based on the road marking points cl and cr, a road shape can be recognized in a more accurate manner.

Note that a search range where the road marking detecting means 13 searches on the horizontal lines j of the reference image T to detect the road marking points cl and cr may be limited. For example, as disclosed in the JP-A No. 2001-092970, the search range may be limited by setting the search range at a current sampling cycle to the neighborhood of positions on the reference image T of lane lines or the like detected at past sampling cycles.

Figure 11:
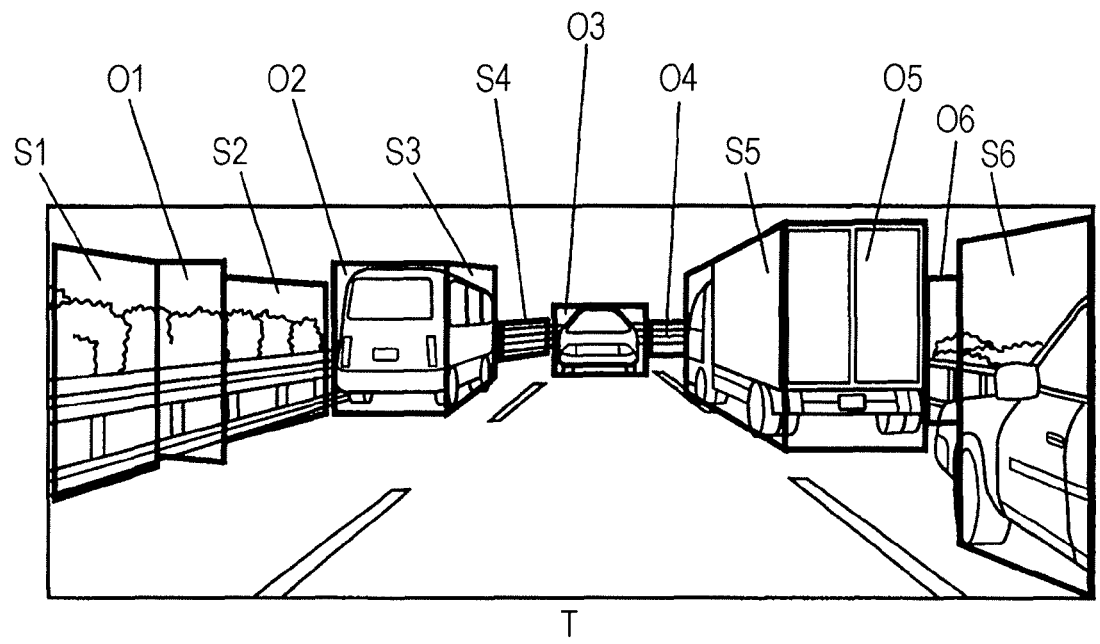
FIG. 11 is a diagram representing an image region corresponding to each three-dimensional object detected on the reference image.

Alternatively, for example, three-dimensional object detecting means may be provided that detects a three-dimensional object such as a vehicle or the like existing above a road surface to detect three-dimensional objects O and S captured on the reference image T, as shown in FIG. 11. In this case the search range can be limited by excluding the image regions corresponding to the detected three-dimensional objects O and S, and searching only within an image region of a road surface other than the three-dimensional objects O and S on the reference image T.

Limiting the search range in this way enables high-speed detection of the road marking points cl and cr, as well as exclusion of the distance data D corresponding to positions above a road surface, generation of road shape models by calculating the approximation lines $L_1$ and $L_2$ and the like based on only the distance data D corresponding to points on the road surface. As a result, recognition accuracy of a road shape can be improved.

On the other hand, as the distance and height detecting means 6, which detects distance data D corresponding to markings on a road surface such as lane lines, i.e., at least information of the distance Z and height Y in real space thereof, the present embodiment uses distance and height detecting means 6 that detects the distance data D by stereo matching as to the pair of images (reference image T and comparative image Tc). In this case, a phenomenon specific to stereo matching such as the following occurs.

Figure 12:
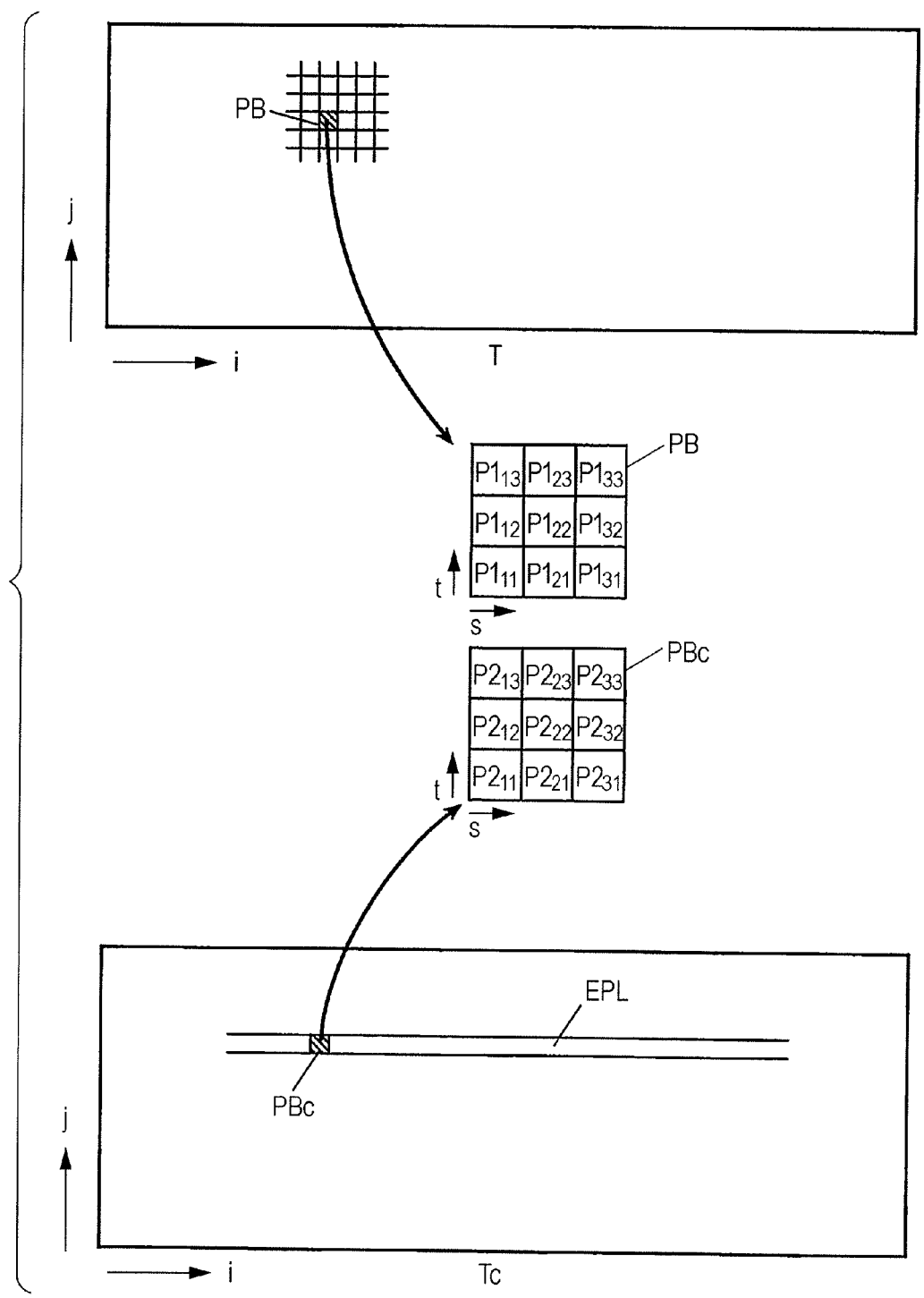
FIG. 12 is a diagram for describing the principle of stereo matching.

In stereo matching performed by the image processor 7 of the distance and height detecting means 6, as shown in FIG. 12, the reference image T is divided into reference pixel blocks PB defined by a predetermined number of pixels, such as 3×3 pixels and 4×4 pixels. Regarding a reference pixel block PB, comparative pixel blocks PBc on an epipolar line EPL in the comparative image Tc are searched that have a same j coordinate as the reference pixel block PB, and the following Expression (9) is performed for each comparative pixel block PBc to determine a comparative pixel block PBc which has a minimum SAD value.

$$SAD = \Sigma |p1st - p2st| \qquad (9)$$

Note that, in the Expression (9), p1st represents the luminance of each pixel within the reference pixel block PB, and p2st represents the luminance of each pixel within the comparative pixel block PBc. Also, the above summation is calculated regarding all the pixels in a range of $1 \leq s \leq 3$ and $1 \leq t \leq 3$ when the reference pixel blocks PB and the comparative pixel blocks PBc are set as regions of 3×3 pixels, and all the pixels in a range of $1 \leq s \leq 4$ and $1 \leq t \leq 4$ when the reference pixel blocks PB and the comparative pixel blocks PBc are set as regions of 4×4 pixels.

With stereo matching, the above parallax dp is calculated from the position on the reference image T of a reference pixel block PB, and the position on the reference image Tc of the comparative pixel block PBc determined regarding this reference pixel block PB.

Therefore, when a reference pixel blocks PB is formed of 3×3 pixels, a same parallax dp is assigned to the nine pixels of the reference pixel block PB, and when a reference pixel block PB is formed of 4×4 pixels, a same parallax dp is assigned to the 16 pixels of the reference pixel block PB.

Figure 13:
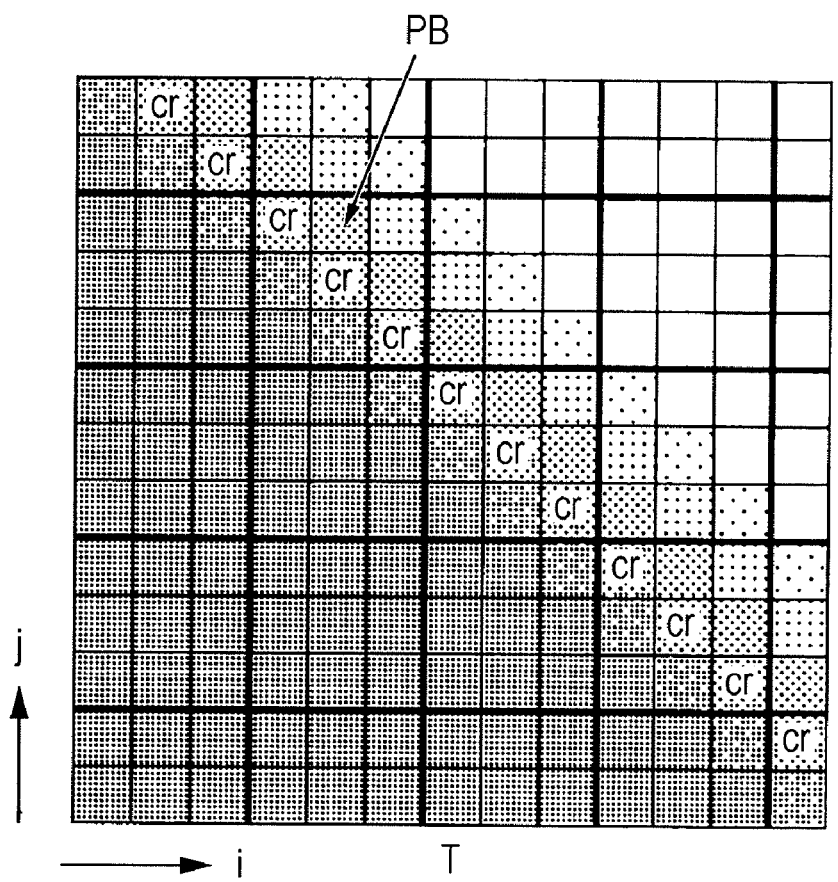
FIG. 13 is an enlarged view of an edge portion of a lane line at the lower right corner in FIG. 10, and is a diagram representing a reference pixel block and a detected road marking point.

As a result of employing such a stereo matching technique is employed, for example, as shown in FIG. 13 that is an enlarged view of the edge portion of a lane line at the lower right corner in FIG. 10, when a road marking point cr is detected on the lane line portion, a same parallax dp is assigned to road marking points cr included in a reference pixel block PB. When following the above Expression (3), the distances Z in real space of the road marking points cr to which the same parallax dp is assigned have a same value. Moreover, since the j coordinate of the road marking pints cr differ, the heights Y in real space of the road marking points cr are calculated as different values from the above Expression (2).

Figure 14:
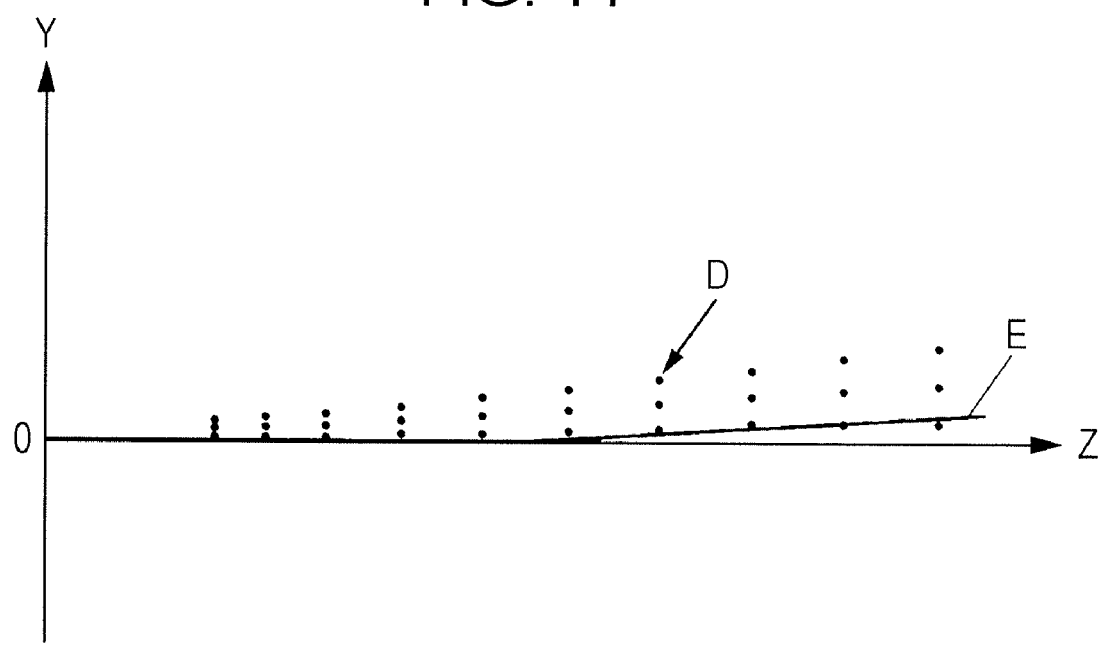
FIG. 14 is a diagram representing that when the distance data of road marking points in a same reference pixel block are plotted on a Z-Y plane, the distance data array in the Y-axis direction.

Therefore, when the distance data D of the road marking points cr included in the same reference pixel block PB is plotted on the distance-height plane (Z-Y plane), a feature appears that each of the distance D is detected, arrayed in the Y-axis direction as shown in FIG. 14. Hereafter, this will be referred to as "first feature".

Each of the road marking points cr is originally a point corresponding to a marking such as a lane line marked on a road surface, and accordingly, the distance in real space Z in real space of each road marking point cr ought to become distant as the j coordinate of the road marking point cr becomes large, i.e., as the position of a captured point becomes upper on the reference image T, the distance data D ought to be arrayed in the Z-axis direction. However, as a result of such stereo matching, the distance data D of each road marking point cr included in the same reference pixel block PB is detected, arrayed in the Y-axis direction.

When such a feature appears, for example, in the case that there is a gentle uphill E shown in FIG. 14 or a gentle downhill (not shown) in front of the vehicle, a slope such as the uphill E or the like is buried in the distance data D of the road marking points cr arrayed in the Y-axis direction, and a gentle slope such as the uphill E or the like is not readily detected. Therefore, a configuration is desirable that eliminates influence of this first feature as much as possible.

Further in this stereo matching technique, as shown in FIGS. 15A through 16C, when the relative positional relationship between a scene captured on the reference image T and a reference pixel block PB is shifted, a feature appears that different parallaxes dp are detected even though reference pixel blocks PB have a same j coordinate. Hereafter, this will be referred to as "second feature".

Figure 15A:
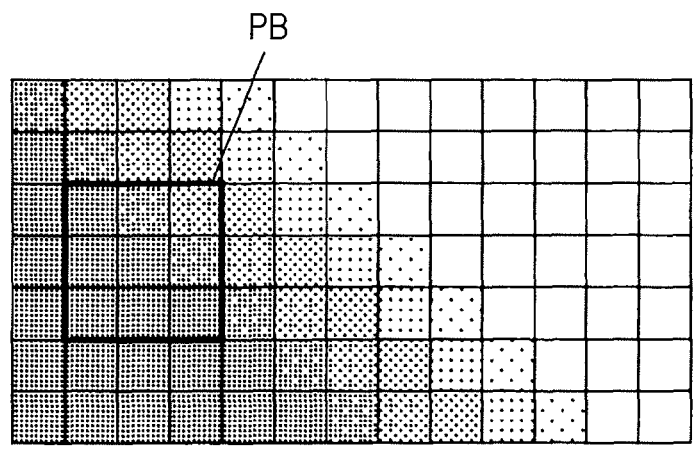
FIGS. 15A through 15C are diagrams illustrating an example wherein the relative positional relationships between a scene captured on the reference image and the reference pixel block are shifted.

For example, in FIG. 15A, when a reference pixel block PB is set so that a portion characteristic of bright luminance in a luminance pattern of the reference pixel block PB, which corresponds to a lane line, appears on an upper right region, i.e., a region of which the j coordinate value is large, as a result of performing stereo matching, a parallax dp is calculated that provides a long distance in real space Z (e.g., 10.5 m) to each pixel in the reference pixel block PB.

Figure 15B:
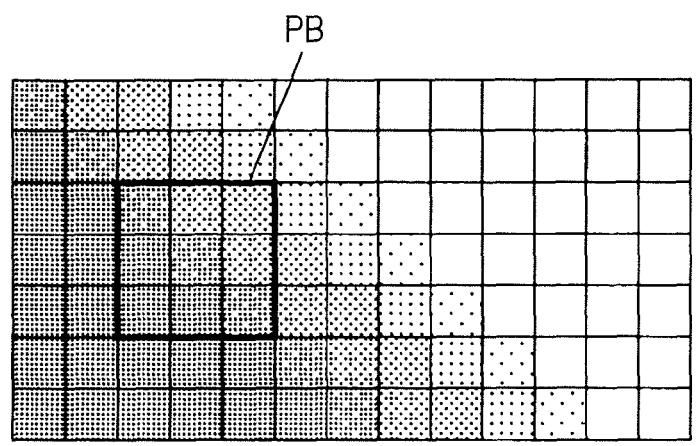

In addition, as shown in FIG. 15B, when a reference pixel block PB is set so that the reference pixel block PB is shifted to the right by one pixel, and captured pixels of a nearer portion of a lane line are included in the reference pixel block PB, as a result of performing stereo matching, a parallax dp is calculated that provides a shorter distance in real space Z (e.g., 10.4 m) than the distance in real space Z for the case of FIG. 15A to each pixel of the reference pixel block PB.

Figure 15C:
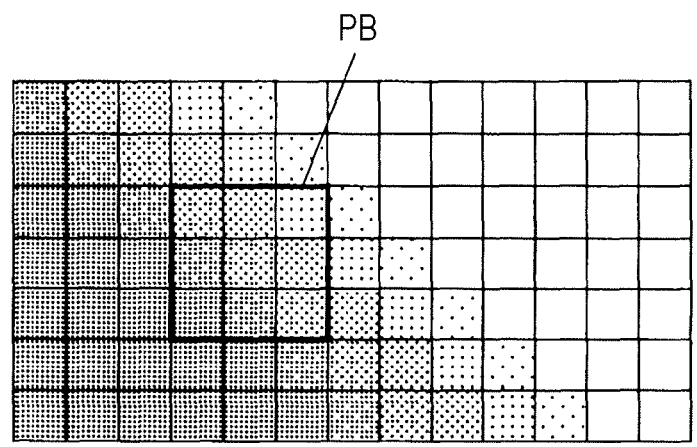
Figure 16A:
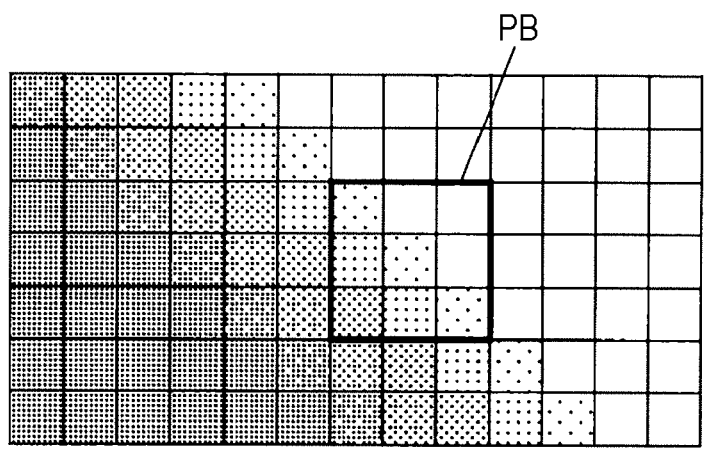
FIGS. 16A through 16C are diagrams illustrating an example wherein the relative positional relationships between a scene captured on the reference image and the reference pixel block are shifted.

Similarly, such shown in FIGS. 15C and 16A, when a reference pixel block PB is set so that the reference pixel block PB is further shifted to the right, and more captured pixels of a further nearer portion of a marking on a road surface are included in the reference pixel block PB, as a result of stereo matching, a parallax dp is calculated that provides a further shorter distance in real space Z (e.g., 10.2 m or 10.3 m) to each pixel of the reference pixel block PB.

Figure 16B:
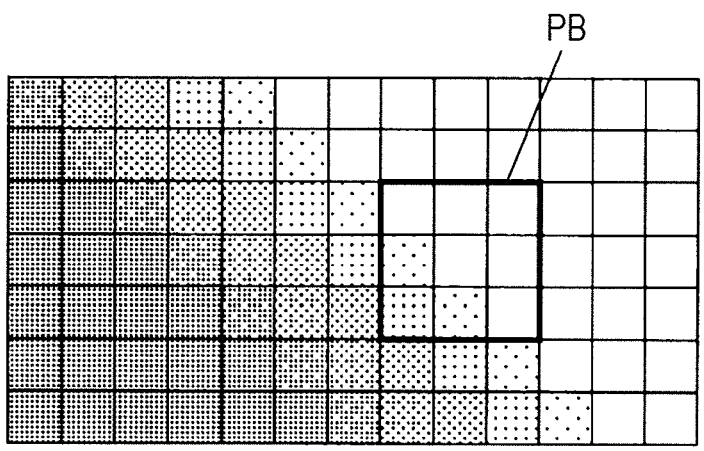
Figure 16C:
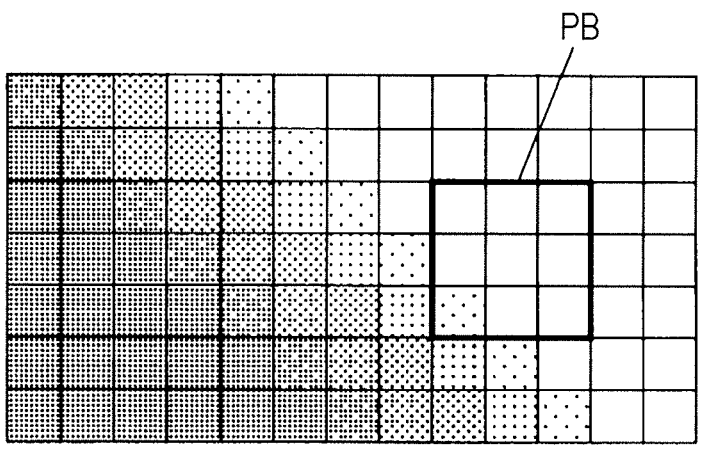

In addition, as shown in FIGS. 16B and 16C, when a reference pixel block PB is set so that the reference pixel block PB is further shifted to the right, a dark portion characteristic of dark luminance in a luminance pattern of the reference pixel block PB appears only on a nearer region of which the lower left j coordinate is small, as a result stereo matching, a parallax dp is calculated that provides a further shorter distance in real space Z (e.g., 10.0 m or 10.1 m) to each pixel of the reference pixel block PB.

The influence of the above first feature which causes a problem shown in FIG. 14 can be eliminated by taking advantage of this second feature.

As described above, as shown in FIG. 17A, when the road marking detecting means 13 detects road marking points cr1 and cr2, searching on the horizontal lines j1 and j2 of the reference image T in the horizontal direction, the road marking detecting means 13 calculates a difference Δp of the luminance p of adjacent pixels, i.e., an edge intensity Δp. In so doing, the edge intensity Δp of an edge portion of a marking on a road surface such as a lane line or the like varies as shown in FIGS. 17B and 17C, for example. In this regard, as described above, a pixel of which the edge intensity Δp is equal to or greater than a predetermined threshold Δpth is detected as the road marking points cr1 and cr2 corresponding to a marking such as a lane line or the like displayed on the road surface.

Moreover, as shown in FIG. 17A, in multiple reference pixel blocks PB(n) arrayed on a horizontal line j of the reference image T, a parallax dp (n) of a pixel differs for each reference pixel block PB(n), and as understood from examples shown in FIGS. 15A through 16C, the parallax dp(1) of each pixel in the reference pixel block PB(1) provides a long distance in real space Z, and the parallax dp(2) of each pixel in the reference pixel block PB(2) provides a shorter distance in real space Z.

Consequently, the parallax dp(1) at the road marking points cr1 and cr2 detected by the road marking detecting means 13 may be corrected by being subjected to weighted averaging with the parallaxes dp(1), dp(2) . . . of the multiple reference pixel blocks PB(1), PB(2) . . . arrayed on the same horizontal line j1 and j2 as the road marking points cr1 and cr2.

More specifically, as shown in FIG. 17B, for a pixel among pixels near the road marking point cr1 the edge intensity Δp(n) of which is equal to or greater than a threshold Δpth, the parallax dp(n) of the pixel is subjected to weighted averaging by a magnitude Δp(n)−Δpth of a portion the edge intensity Δp(n) of which is equal to or greater than the threshold Δpth, and a resulted weighted average Dp is corrected as the parallax of the road marking point cr1 on horizontal line j1 in the following Expression (10).

$$Dp = \{\Sigma dp(n)\cdot(\Delta p(n)-\Delta pth)\}/\{\Sigma(\Delta p(n)-\Delta pth)\} \quad (10)$$

Similarly, as shown in FIG. 17C, with regard to the road marking point cr2, for pixel among pixels near the road marking point cr2 the edge intensity Δp(n) of which is equal to or greater than the threshold Δpth, the parallax dp(n) of the pixel is subjected to weighted averaging by the magnitude Δp(n)−Δpth of a portion the edge intensity Δp(n) of which is equal to or greater than the threshold Δpth, and this weighted averaging Dp is corrected as the parallax of a resultant road marking point cr2 on the horizontal line j2.

In the correction of the parallax of the road marking point cr1, as shown in FIG. 17B, the parallax of the road marking point cr1 itself before the correction is dp(1), but the parallax dp(2) of the pixels belonging to the reference pixel block PB(2) near the right side thereof is greatly weighed. Therefore, the parallax Dp after the correction of the road marking point cr1 has a value approximate to the parallax dp(2) rather than the parallax dp(1), the value before the correction, and is corrected to the parallax DP that provides a distance in real space Z shorter than a distance in real space Z which the parallax dp(1) originally provides, i.e., a distance Z on the near side.

On the other hand, in the correction of the parallax of the road marking point cr2, as shown in FIG. 17C, the parallax of the road marking point cr2 itself before the correction is dp(1), the parallax of the pixels near the right side thereof is often parallax dp(1), and thus the parallax dp(2) of the pixels belonging to the reference pixel block PB(2) makes only a small contribution. Therefore, the parallax Dp after the correction of the road marking point cr2 has almost the same value as the parallax dp(1), the value before the correction, and is corrected to the parallax DP that provides a long distance in real space Z distant from the vehicle that is almost the same distance in real space Z which the parallax dp(1) originally provides.

Therefore, before the correction, the same parallax dp(1) is assigned to the road marking points cr1 and cr2 included in the same pixel block PB(1), and accordingly, as shown in FIG. 14, the distance D of the road marking points cr1 and cr2 are detected, arrayed in the Y-axis direction (the above first feature), but after the correction, even when the road marking points cr1 and cr2 are included in the same pixel block PB(1), the distance in real space Z of the road marking point cr1 on the side near the vehicle is corrected to a shorter distance Z than the distance in real space Z of the road marking point cr2 on the side distant from the vehicle.

As described above, a particular phenomenon that occurs when stereo matching is employed for the detection of the distance data D corresponding to a marking on a road surface such as a lane line and arrow, i.e., the influence of the above first feature wherein the same parallax dp is assigned to the road marking points cr included in the same pixel block PB, can accurately be eliminated by taking advantage of the above second feature.

Moreover, the parallax dp of each of the road marking points cr corresponding to a marking on a road surface can be corrected to the parallax Dp so as to meet an actual situation where, for example, the distance in real space Z increases as the j coordinate on the reference image T becomes large, i.e., the position of an image is captured on the reference image T becomes upper.

Therefore, by approximating a plurality of distance data D including the distance Z and height Y in real space corresponding to the parallax Dp thus corrected with the two approximation lines $L_1$ and $L_2$ as described above, for example, the gentle uphill E or the like shown in FIG. 14 can accurately be recognized, and the recognition accuracy of a road shape can further be improved.

Note that, in the calculation of the above Expression (10), when a pixel of which the edge intensity $\Delta p(n)$ is equal to or greater than the threshold $\Delta pth$ also exists in the reference pixel block PB(3) on the right of the reference pixel block PB(2), and further in the reference pixel block PB on the right thereof, of course the parallax dp(n) of each reference pixel block PB(n) is also subjected to weighted averaging.

What is claimed is:

1. A road shape recognition device comprising:
   distance and height detecting means configured to detect distance data having at least information of distance and height in real space regarding a road surface where a vehicle is traveling at a plurality of mutually different points;
   approximation line calculating means configured to divide said plurality of distance data into a near group and a far group as viewed from said vehicle based on said distance in real space to calculate approximation lines for approximating said distance data for said groups respectively each time said distance data of a boundary portion between said two groups is transferred from one of said groups to the other of said groups;
   statistics calculating means configured to calculate statistics based on said approximation lines for each said group where said distance data is transferred; and
   road shape model generating means configured to select one out of combinations of said approximation lines for said two groups to generate a road shape model using the selected combination of said approximation lines as at least a shape on a distance-height plane, based on said calculated statistics of said two groups.

2. The road shape recognition device according to claim 1, wherein said approximation line calculating means uses the least square method to calculate said approximation lines for approximating said distance data for said groups respectively;
   wherein said statistics calculating means calculates a variance or standard deviation as to said approximation lines of said distance data belonging to said groups respectively as said statistics; and
   wherein said road shape model generating means selects a combination of said approximation lines that minimizes the total sum of said calculated statistics of said two groups.

3. The road shape recognition device according to claim 2, wherein when the distance and height in real space of said distance data are represented as Z and Y respectively, the distance and height in real space of said distance data of said boundary portion to be transferred are represented as Za and Ya respectively, and the summation for each of said groups is represented using $\Sigma$, said approximation line calculating means calculates said approximation lines for approximating said distance data for said groups respectively using the least square method by subtracting Za, Ya, $Za^2$ and ZaYa from $\Sigma Z, \Sigma Y, \Sigma Z^2$ and $\Sigma ZY$ of one of said groups respectively, and adding Za, Ya, $Za^2$ and ZaYa to $\Sigma Z, \Sigma Y, \Sigma Z^2$ and $\Sigma ZY$ of the other of said groups respectively each time the distance data of the boundary portion is transferred from one of said groups to the other of said groups.

4. The road shape recognition device according to claim 1, wherein among of said plurality of distance data detected by said distance and height detecting means, said approximation line calculating means approximates, using said approximation lines, a plurality of distance data included in a predetermined range from the position of a road shape model at a current sampling cycle, which is estimated from a subsequent behavior of said vehicle based on said road shape models detected at past sampling cycles.

5. The road shape recognition device according to claim 1, wherein said road shape model generating means replaces an intersection portion of said selected approximation lines of said two groups with an easement curve the tangent lines of which are said approximation lines to correct said generated road shape model.

6. The road shape recognition device according to claim 1, further comprising:
   road marking detecting means configured to detect a road marking point corresponding to a marking on a road surface including a lane line marked lateral to said vehicle;
   wherein said approximation line calculating means calculates said approximation lines for said groups respectively using said plurality of distance data, which correspond to said road marking point detected by said road marking detecting means, and of which at least the distance and height in real space are detected by said distance and height detecting means.

7. The road shape recognition device according to claim 6, wherein said distance and height detecting means uses stereo matching as to a pair of images captured by image capturing means to detect said distance data for each pixel of at least one image of said pair of images;
   wherein said road marking detecting means detects said road marking point based on the luminance of pixels of said one image; and
   wherein said approximation line calculating means corrects said distance data corresponding to said road marking point detected by said road marking detecting means based on the luminance of pixels near road marking points including said road marking point, and approximates a plurality of corrected distance data by said approximation lines.

* * * * *